(12) United States Patent
Onishi

(10) Patent No.: US 11,381,788 B2
(45) Date of Patent: Jul. 5, 2022

(54) IMAGING DEVICE AND IMAGING SYSTEM CONTROLLING THE READ OUT OF SIGNALS FROM A PLURALITY OF PIXELS

(71) Applicant: CANON KABUSHIKI KAISHA, Tokyo (JP)

(72) Inventor: Tomoya Onishi, Ayase (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 16/722,646

(22) Filed: Dec. 20, 2019

(65) Prior Publication Data

US 2020/0213564 A1 Jul. 2, 2020

(30) Foreign Application Priority Data

Dec. 28, 2018 (JP) ................................ JP2018-246927

(51) Int. Cl.
  *H04N 9/04* (2006.01)
  *H04N 5/345* (2011.01)
  *H04N 5/347* (2011.01)

(52) U.S. Cl.
  CPC ......... *H04N 9/04511* (2018.08); *H04N 5/345* (2013.01); *H04N 5/347* (2013.01)

(58) Field of Classification Search
  None
  See application file for complete search history.

(56) References Cited

U.S. PATENT DOCUMENTS

| | | |
|---|---|---|
| 9,142,575 B2 | 9/2015 | Kobayashi |
| 9,883,152 B2 | 1/2018 | Onishi |
| 9,894,308 B2 | 2/2018 | Onishi |
| 9,900,532 B2 | 2/2018 | Takado |
| 9,924,121 B2 | 3/2018 | Onishi |
| 10,021,358 B2 | 7/2018 | Onishi |
| 10,122,951 B2 | 11/2018 | Takado |
| 10,356,286 B2 | 7/2019 | Ito |

(Continued)

FOREIGN PATENT DOCUMENTS

| | | |
|---|---|---|
| JP | 2013-247289 | 12/2013 |
| JP | 2015-88947 | 5/2015 |
| JP | 2016-213715 | 12/2016 |

OTHER PUBLICATIONS

U.S. Appl. No. 16/707,217, filed Dec. 9, 2019 by Yasushi Iwakura et al.

*Primary Examiner* — Quan Pham
(74) *Attorney, Agent, or Firm* — Venable LLP

(57) ABSTRACT

An imaging device includes pixels each including a holding portion, and an output unit, and a control unit that controls readout of pixel signals. The pixels include first to fourth pixels that output signals based on light of first to fourth wavelength ranges. A first unit pixel includes the first and second pixels but no third pixel, which share the holding portion. A second unit pixel includes the first and third pixels but no second pixel, which share the holding portion. A third unit pixel includes the first and fourth pixels but neither second nor third pixel, which share the holding portion. The control unit reads, from the first unit pixel, a signal in which signals of the first and second pixels are added in the holding portion, and reads, from the third unit pixel, a signal in which signals of the first pixels are added in the holding portion.

18 Claims, 20 Drawing Sheets

(56) References Cited

U.S. PATENT DOCUMENTS

| | | |
|---|---|---|
| 10,382,714 B2 | 8/2019 | Michimata |
| 10,419,702 B2 | 9/2019 | Onishi |
| 10,462,430 B2 | 10/2019 | Yamamoto |
| 2009/0184384 A1 | 7/2009 | Sanfilippo |
| 2014/0299747 A1 | 10/2014 | Tachino |
| 2015/0116566 A1 | 4/2015 | Yamamoto |
| 2015/0264325 A1* | 9/2015 | Hirota ............... H04N 9/77 348/279 |
| 2016/0330414 A1 | 11/2016 | Takado |
| 2016/0337623 A1 | 11/2016 | Onishi |
| 2017/0289480 A1* | 10/2017 | Ochiai ............ H04N 5/3696 |
| 2018/0109769 A1 | 4/2018 | Onishi |
| 2019/0281192 A1 | 9/2019 | Ito |
| 2020/0029056 A1 | 1/2020 | Yamamoto |
| 2020/0112662 A1* | 4/2020 | Sakamoto ......... H04N 5/2354 |

* cited by examiner

FIG. 7

IMAGING DEVICE AND IMAGING SYSTEM CONTROLLING THE READ OUT OF SIGNALS FROM A PLURALITY OF PIXELS

BACKGROUND OF THE INVENTION

Field of the Invention

The present disclosure relates to an imaging device and an imaging system.

Description of the Related Art

In a single-plate type imaging device, to obtain a color image, color filters (CF) which transmit lights of respective colors of particular wavelength components, for example, red (R), green (G), and blue (B) are arranged over pixels in a predetermined pattern. As a CF pattern, a pattern with so-called Bayer arrangement is widely used. Further, in addition to the CF of RGB, a use of a CF with RGBW arrangement having W pixels that has filters which transmit light of a whole wavelength range of visible light has become prevalent.

Japanese Patent Application Laid-Open No. 2016-213715 and Japanese Patent Application Laid-Open No. 2015-088947 disclose an imaging device having a CF with the RGBW arrangement. The imaging device having the CF with the RGBW arrangement can improve sensitivity and acquire an image with a high S/N ratio by using W pixels.

As a scheme for improving sensitivity of an imaging device, a method of adding (also referred to as binning) and reading out pixel signals of a plurality of pixels is known. One way to add pixel signals may be, in a plurality of pixels sharing a floating diffusion portion, to transfer signal charge generated in photoelectric converters of the plurality of pixels to a single floating diffusion portion and read out the transferred signal charge as a single pixel signal.

In the configuration of the imaging device disclosed in Japanese Patent Application Laid-Open No. 2015-088947, however, since color pixels of different colors share a floating diffusion portion, color mixture may occur when pixel signals are added by using a floating diffusion portion, and color reproducibility may decrease.

SUMMARY OF THE INVENTION

The present disclosure intends to provide an imaging device and an imaging system that can improve sensitivity without deteriorating color reproducibility and acquire an image with a high S/N ratio.

According to one aspect of the present disclosure, provided is an imaging device including a plurality of pixels each including a photoelectric converter, a holding portion to which charge generated in the photoelectric converter is transferred, and an output unit that outputs a signal in accordance with an amount of charge held in the holding portion, and a control unit that controls readout of signals from the plurality of pixels. The plurality of pixels includes a plurality of first pixels each configured to output a signal in accordance with a light of a first wavelength range, a plurality of second pixels each configured to output a signal in accordance with a light of a second wavelength range that is different from the first wavelength range, a plurality of third pixels each configured to output a signal in accordance with a light of a third wavelength range that is different from the first wavelength range and the second wavelength range, and a plurality of fourth pixels each configured to output a signal in accordance with a light of a fourth wavelength range that is different from the first wavelength range, the second wavelength range, and the third wavelength range. The plurality of pixels forms a plurality of first unit pixels each including the first pixels and the second pixel but not including the third pixel, in which the first pixels and the second pixel share the holding portion, a plurality of second unit pixels each including the first pixels and the third pixel but not including the second pixel, in which the first pixels and the third pixel share the holding portion, a plurality of third unit pixels each including the first pixels and the fourth pixel but not including the second pixel and the third pixel, in which the first pixels and the fourth pixel share the holding portion. The control unit reads out, from each of the plurality of first unit pixels, a signal in which signals of the first pixels and a signal of the second pixel are added in the holding portion, and the control unit is configured to read out, from each of a part of the plurality of third unit pixels, a signal in which signals of the first pixels are added in the holding portion by transferring charges of the photoelectric converters of the first pixels to the holding portion without transferring charge of the photoelectric converter of the fourth pixel.

Further, according to another aspect of the present disclosure, provided is a signal processing device including a signal processing unit that processes signals output from an imaging device including a plurality of pixels including a first pixel having higher sensitivity than a second to fourth pixels, the second pixel configured to output a signal including color information of a first color, the third pixel configured to output a signal including color information of a second color that is different from the first color, and the fourth pixel configured to output a signal including color information of a third color that is different from the first color and the second color. The imaging device outputs first addition data in which a signal of the second pixel and a signal of the first pixel are added, second addition data in which a signal of the third pixel and a signal of the first pixel are added, and third addition data in which a signal of the fourth pixel and a signal of the first pixel are added, and the signal processing unit calculates color difference data between the first color and the third color by subtracting the third addition data from the first addition data and calculates color difference data between the second color and the third color by subtracting the third addition data from the second addition data.

Further, according to another aspect of the present disclosure, provided is a signal processing device including a signal processing unit that processes signals output from an imaging device including a plurality of pixels including a first pixel having higher sensitivity than a second to fourth pixels, the second pixel configured to output a signal including color information of a first color, the third pixel configured to output a signal including color information of a second color that is different from the first color, and the fourth pixel configured to output a signal including color information of a third color that is different from the first color and the second color. The imaging device outputs first addition data in which a signal of the second pixel and a signal of the first pixel are added, second addition data in which a signal of the third pixel and a signal of the first pixel are added, third addition data in which a signal of the fourth pixel and a signal of the first pixel are added, and fourth addition data in which signals of the first pixel are added, and the signal processing unit calculates color data of the first color by subtracting the fourth addition data from the first addition data, calculates color data of the second color by subtracting the fourth addition data from the second addition data, and calculates color data of the third color by subtracting the fourth addition data from the third addition data.

Further features of the present disclosure will become apparent from the following description of exemplary embodiments with reference to the attached drawings.

BRIEF DESCRIPTION OF THE DRAWINGS

FIG. 7 is a diagram illustrating data arrangement when pixel addition is performed on a unit pixel basis in the method of driving the imaging device according to the first embodiment of the present disclosure.

DESCRIPTION OF THE EMBODIMENTS

First Embodiment

An imaging device and a method of driving the same according to a first embodiment of the present disclosure will be described with reference to FIG. 1 to FIG. 9.

Figure 1:
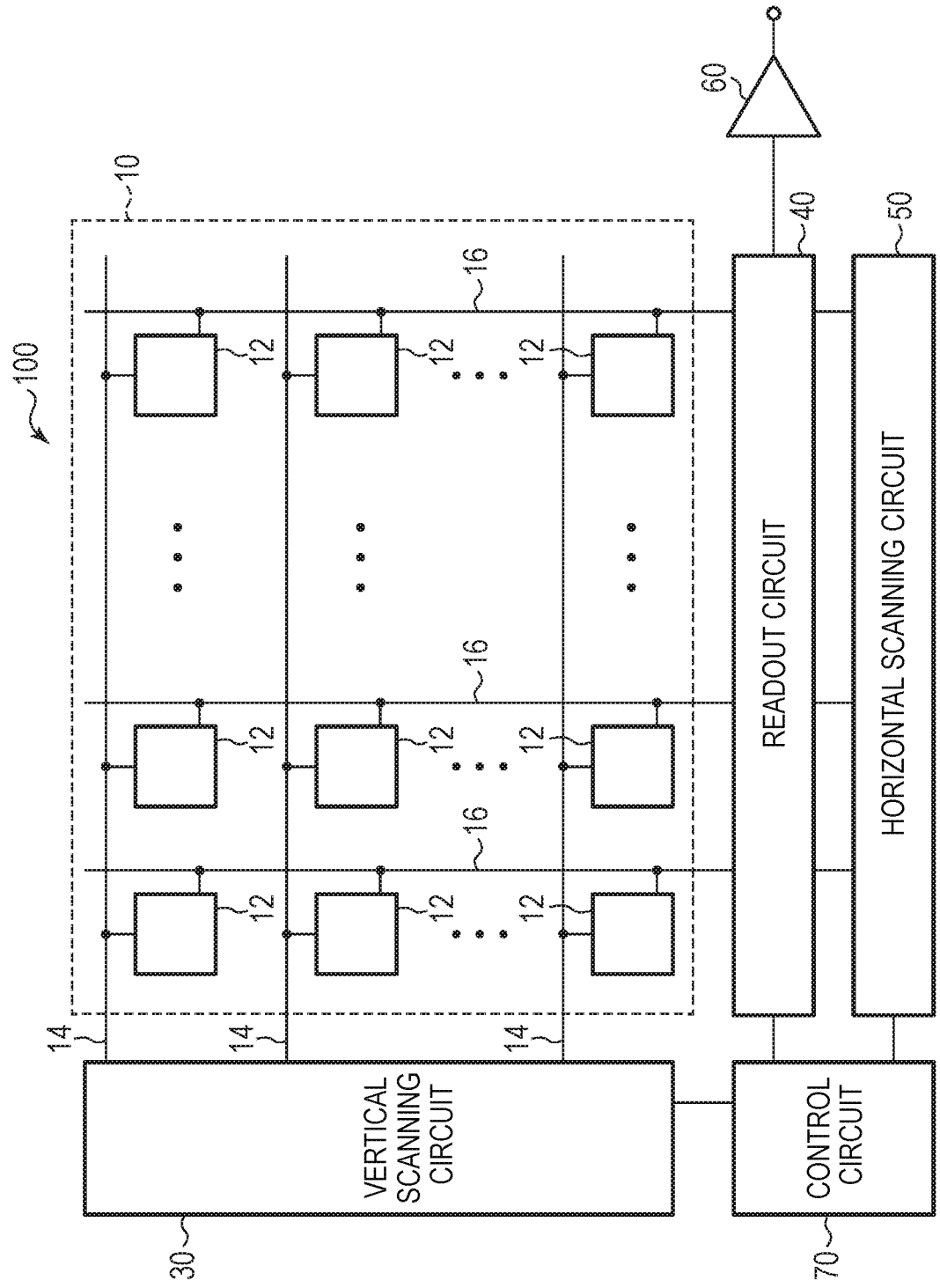
FIG. 1 is a block diagram illustrating a general configuration of an imaging device according to a first embodiment of the present disclosure.
Figure 2:
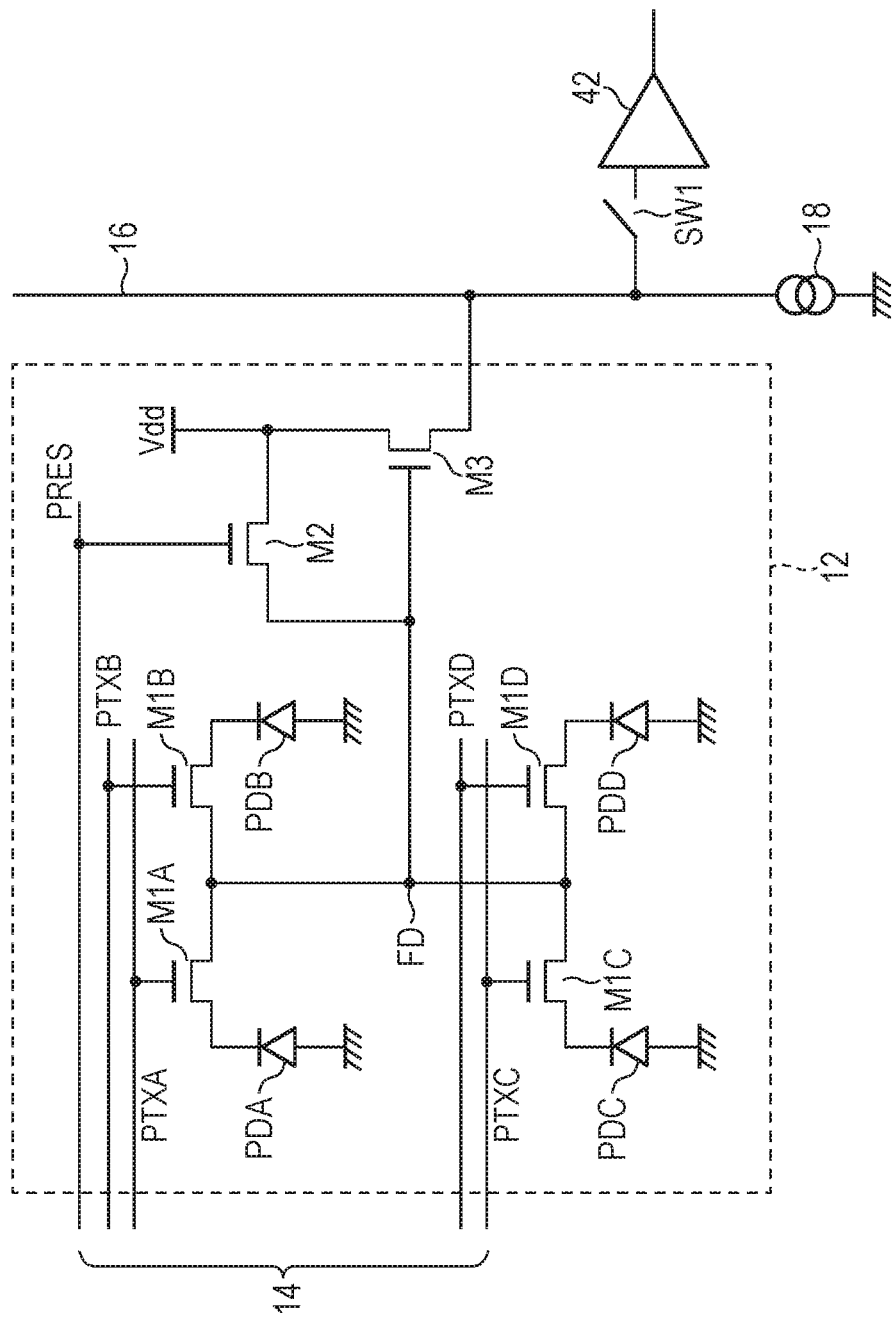
FIG. 2 is a circuit diagram illustrating a configuration example of a unit pixel of the imaging device according to the first embodiment of the present disclosure.
Figure 3:
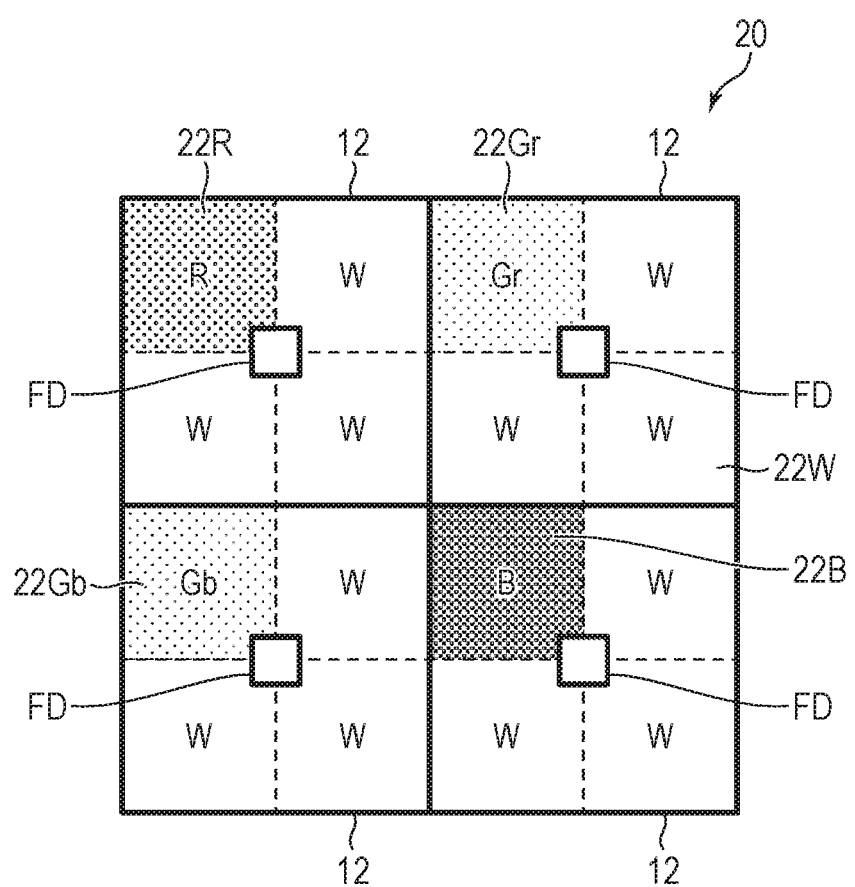
FIG. 3 is a plan view illustrating a pixel block of a pixel region in the imaging device according to the first embodiment of the present disclosure.
Figure 4:
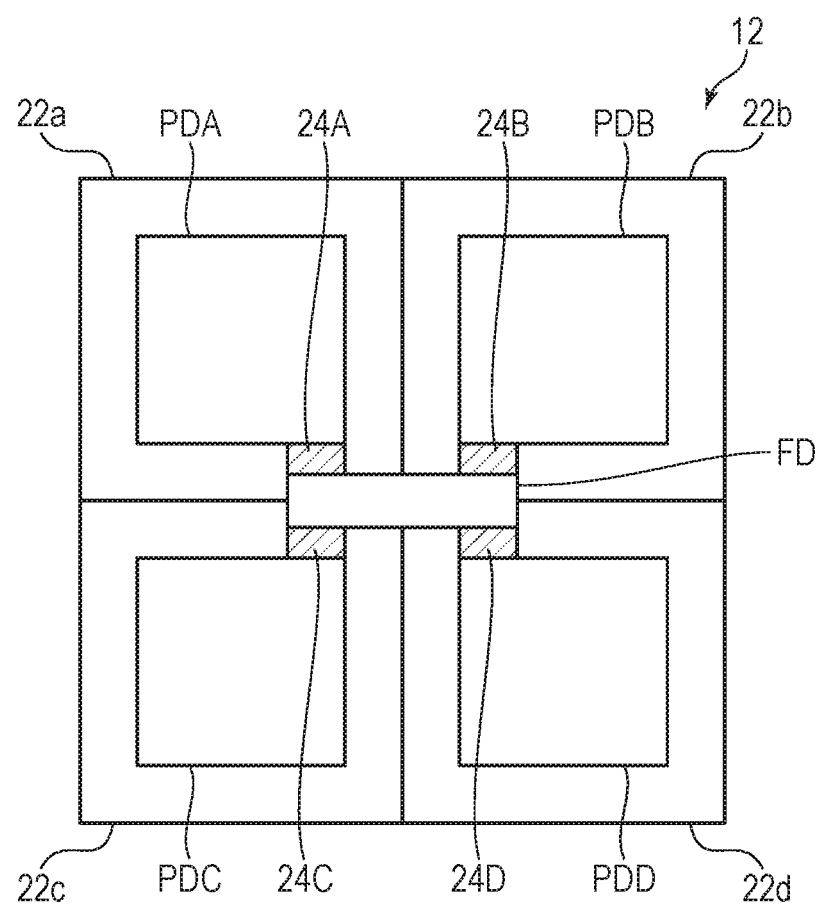
FIG. 4 is a plan view illustrating a configuration example of a unit pixel of the imaging device according to the first embodiment of the present disclosure.

First, the structure of an imaging device according to the present embodiment will be described with reference to FIG. 1 to FIG. 4. FIG. 1 is a block diagram illustrating a general configuration of the imaging device according to the present embodiment. FIG. 2 is a circuit diagram illustrating a configuration example of a unit pixel of the imaging device according to the present embodiment. FIG. 3 is a plan view illustrating a pixel block of a pixel region in the imaging device according to the present embodiment. FIG. 4 is a plan view illustrating a configuration example of a unit pixel of the imaging device according to the present embodiment.

As illustrated in FIG. 1, an imaging device 100 according to the present embodiment includes a pixel region 10, a vertical scanning circuit 30, a readout circuit 40, a horizontal scanning circuit 50, an output circuit 60, and a control circuit 70.

In the pixel region 10, a plurality of unit pixels 12 arranged in a matrix over a plurality of rows and a plurality of columns are provided. Each of the unit pixels 12 includes a photoelectric conversion element that converts an incident light into charge in accordance with the light amount. The number of rows and the number of columns of the unit pixels 12 arranged in the pixel region 10 are not particularly limited. Further, in the pixel region 10, in addition to the unit pixels 12 that output signals in accordance with the light amount of an incident light, other pixels (not illustrated) such as an optical black pixel that is shielded from light, a dummy pixel that does not output a signal, or the like may be arranged.

On each row of the pixel region 10, a control line 14 extending in a first direction (the horizontal direction in FIG. 1) is provided. The control line 14 is connected to the unit pixels 12 aligned in the first direction, respectively, to form a signal line common to these unit pixels 12. The first direction in which the control line 14 extends may be referred to as a row direction or the horizontal direction. The control line 14 on each row is connected to the vertical scanning circuit 30. Note that the control line 14 on each row may include a plurality of signal lines.

On each column of the pixel region 10, an output line 16 extending in a second direction (the vertical direction in FIG. 1) crossing the first direction is provided. The output line 16 is connected to the unit pixels 12 aligned in the second direction, respectively, to form a signal line common to these unit pixels 12. The second direction in which the output line 16 extends may be referred to as a column direction or the vertical direction. The output line 16 on each column is connected to the readout circuit 40. Note that the output line 14 on each column may include a plurality of signal lines.

The vertical scanning circuit 30 is a control unit that supplies, to the unit pixels 12 via the control lines 14 provided on a row basis in a pixel region 10, control signals used for driving readout circuits inside the unit pixels 12 when reading out a signal from each of the unit pixels 12. The vertical scanning circuit 30 may be formed by using a shift register or an address decoder. Signals read out from the unit pixels 12 are input to the readout circuit 40 via the output lines 16 provided on a column basis in the pixel region 10.

The readout circuit 40 is a circuit unit that performs predetermined processing, for example, signal processing such as an amplification process, an addition process, or the like on a signal read out from the unit pixel 12. The readout circuit 40 may include a signal holding portion, a column amplifier, a correlated double sampling (CDS) circuit, an addition circuit, or the like. The readout circuit 40 may further include an analog-to-digital (A/D) converter circuit or the like if necessary.

The horizontal scanning circuit 50 is a circuit unit that supplies, to the readout circuit 40, control signals used for transferring signals processed in the readout circuit 40 to the output circuit 60 sequentially on a column basis. The horizontal scanning circuit 50 may be formed by using a shift register or an address decoder. The output circuit 60 is a circuit unit formed of a buffer amplifier, a differential amplifier, or the like and configured to amplify a signal on a column selected by the horizontal scanning circuit 50 and output the amplified signal.

The control circuit 70 is a circuit unit used for supplying, to the vertical scanning circuit 30, the readout circuit 40, and the horizontal scanning circuit 50, control signals that controls the operations or the timings thereof. Some or all of the control signals supplied to the vertical scanning circuit 30, the readout circuit 40, and the horizontal scanning circuit 50 may be supplied from the outside of the imaging device 100.

As illustrated in FIG. 2, for example, each of the unit pixels 12 may be configured to include photoelectric converters PDA, PDB, PDC, and PDD, transfer transistors M1A, M1B, M1C, and M1D, a reset transistor M2, and an amplifier transistor M3. Note that, in the following description, when the photoelectric converters PDA, PDB, PDC, and PDD are collectively illustrated, which may be denoted as the photoelectric converter(s) PD. Further, when collectively illustrated, the transfer transistors M1A, M1B, M1C, and M1D may be denoted as the transfer transistor(s) M1.

Each of the photoelectric converters PDA, PDB, PDC, and PDD is a photodiode, for example. The photodiode of the photoelectric converter PDA has the anode connected to a ground voltage node and the cathode connected to the source of the transfer transistor M1A. The photodiode of the photoelectric converter PDB has the anode connected to a ground voltage node and the cathode connected to the source of the transfer transistor M1B. The photodiode of the photoelectric converter PDC has the anode connected to a ground voltage node and the cathode connected to the source of the transfer transistor M1C. The photodiode of the photoelectric converter PDD has the anode connected to a ground voltage node and the cathode connected to the source of the transfer transistor M1D.

The drains of the transfer transistors M1A, M1B, M1C, and M1D are connected to the source of the reset transistor M2 and the gate of the amplifier transistor M3. The connection node of the drains of the transfer transistors M1A, M1B, M1C, and M1D, the source of the reset transistor M2, and the gate of the amplifier transistor M3 is a so-called floating diffusion portion FD. The floating diffusion portion FD includes a capacitance component (floating diffusion capacitance) and forms a holding portion for charge caused by the capacitance component.

The drain of the reset transistor M2 and the drain of the amplifier transistor M3 are connected to the power supply voltage node (voltage Vdd). Note that the voltage supplied to the drain of the reset transistor M2 and the voltage supplied to the drain of the amplifier transistor M3 may be the same or may be different from each other. The source of the amplifier transistor M3 is connected to the output line 16 on a column associated with the unit pixel 12 of interest. A current source 18 is connected to the output line 16.

The readout circuit 40 is connected to the output line 16 as described above. FIG. 2 illustrates, as a part of components of the readout circuit 40, a switch SW1 and a column amplifier 42 connected to the output line 16 on a column associated with the unit pixel 12 of interest.

In the case of the unit pixel 12 having the configuration illustrated in FIG. 2, the control line 14 arranged on each row of the pixel region 10 may include five signal lines that supply control signals PTXA, PTXB, PTXC, PTXD, and PRES. The signal line that supplies the control signal PTXA is connected to the gates of the transfer transistors M1A on the unit pixels 12 belonging to the corresponding row, respectively, to form a signal line common to these unit pixels 12. The signal line that supplies the control signal PTXB is connected to the gates of the transfer transistors M1B on the unit pixels 12 belonging to the corresponding row, respectively, to form a signal line common to these unit pixels 12. The signal line that supplies the control signal PTXC is connected to the gates of the transfer transistors M1C on the unit pixels 12 belonging to the corresponding row, respectively, to form a signal line common to these unit pixels 12. The signal line that supplies the control signal PTXD is connected to the gates of the transfer transistors M1D on the unit pixels 12 belonging to the corresponding row, respectively, to form a signal line common to these unit pixels 12. The signal line that supplies the control signal PRES is connected to the gates of the reset transistors M2 on the unit pixels 12 belonging to the corresponding row, respectively, to form a signal line common to these unit pixels 12.

When each transistor forming the unit pixel 12 is formed of an n-channel transistor, when a high-level control signal is supplied from the vertical scanning circuit 30, a corresponding transistor is turned on. Further, when a low-level control signal is supplied from the vertical scanning circuit 30, a corresponding transistor is turned off.

Each of the photoelectric converters PDA, PDB, PDC, and PDD converts (photoelectrically converts) an incident light into an amount of charge in accordance with the light amount and accumulates the generated charge. The transfer transistor M1A is controlled by the control signal PTXA and, when turned on, transfers charge held by the photoelectric converter PDA to the floating diffusion portion FD. Similarly, the transfer transistor M1B is controlled by the control signal PTXB and, when turned on, transfers charge held by the photoelectric converter PDB to the floating diffusion portion FD. Further, the transfer transistor M1C is controlled by the control signal PTXC and, when turned on, transfers charge held by the photoelectric converter PDC to the floating diffusion portion FD. Further, the transfer transistor M1D is controlled by the control signal PTXD and, when turned on, transfers charge held by the photoelectric converter PDD to the floating diffusion portion FD.

The floating diffusion portion FD holds charge transferred from the photoelectric converters PDA, PDB, PDC, and PDD and sets its voltage to a predetermined voltage in accordance with the capacitance value of the floating diffusion portion FD and the amount of transferred charge. The reset transistor M2 is controlled by the control signal PRES and, when turned on, resets the floating diffusion portion FD to a predetermined voltage in accordance with the voltage Vdd.

The amplifier transistor M3 is configured such that the voltage Vdd is supplied to the drain and a bias current is supplied to the source from the current source 18 via the output line 16 and forms an amplifier unit (source follower circuit) whose gate is the input node. Thereby, the amplifier transistor M3 outputs, to the output line 16, a signal in accordance with the amount of charge generated by incident light to the photoelectric converters PDA, PDB, PDC, and PDD. Note that, in this specification, the amplifier transistor M3 may be referred to as an output unit.

When, out of the transfer transistors M1A to M1D, any one or more transfer transistors M1 associated with an operation mode are turned on, charge of the photoelectric converter PD connected to the turned-on transfer transistor M1 is transferred to the floating diffusion portion FD. For example, when only the transfer transistor M1A is turned on, charge held in the photoelectric converter PDA is transferred to the floating diffusion portion FD, and a signal in accordance with the amount of charge generated by incident light to the photoelectric converter PDA is output to the output line 16. Further, when all the transfer transistors M1A to M1D are turned on, charges held in the photoelectric converters PDA to PDD are added in the floating diffusion portion FD, and a signal in accordance with the total amount of charges generated by the incident light to the photoelectric converters PDA to PDD is output to the output line 16.

The signal output to the output line 16 is input to the column amplifier 42 via the switch SW1 and converted into a digital signal by an AD converter (not illustrated) arranged on the post-stage thereof.

Note that each of the unit pixels 12 includes four pixels corresponding to each of the four photoelectric converters PDA, PDB, PDC, and PDD. In these four pixels, a first pixel is formed of the photoelectric converter PDA, the transfer transistor M1A, the reset transistor M2, and the amplifier transistor M3. A second pixel is formed of the photoelectric converter PDB, the transfer transistor M1B, the reset transistor M2, and the amplifier transistor M3. A third pixel is formed of the photoelectric converter PDC, the transfer transistor M1C, the reset transistor M2, and the amplifier transistor M3. A fourth pixel is formed of the photoelectric converter PDD, the transfer transistor M1D, the reset transistor M2, and the amplifier transistor M3. These four pixels share the floating diffusion portion FD, the reset transistor M2, and the amplifier transistor M3.

The pixel region 10 is formed by arranging a unit blocks 20 illustrated in FIG. 3 repeatedly in the row direction and the column direction. That is, the unit block 20 is the minimum repetition unit in the pixel region 10.

The unit block 20 is formed of four unit pixels 12 arranged in a matrix of two rows by two columns. One unit pixel 12 includes four pixels arranged in a matrix of two rows by two columns. In the following description, when a row and a column of the unit pixels 12 are expressed, expressions of "unit pixel row" and "unit pixel column" are used, and when a row and a column of pixels included in the unit pixel 12 are expressed, expressions of "pixel row" and "pixel column" are used. That is, the unit block 20 includes four unit pixels 12 arranged in a matrix of two unit pixel rows by two unit pixel columns. Further, the unit block 20 includes 16 pixels arranged in a matrix of 4 pixel rows by 4 pixel columns.

Each of the 16 pixels arranged in the unit block 20 includes a color filter having a predetermined spectral sensitivity characteristic. Each of the characters "R", "Gr", "Gb", "B", and "W" illustrated in FIG. 3 represents a spectral sensitivity characteristic of a color filter provided to the corresponding pixel. That is, "R" represents a red filter, "Gr" and "Gb" each represent a green filter, "B" represents a blue filter, and "W" represents a white filter. The filters "Gr" and "Gb" are green filters having the same spectral sensitivity characteristic. To distinguish the two green filters included in a single unit block 20 from each other, a green filter arranged on the same pixel column as a red filter R is denoted as "Gr", and a green filter arranged on the same pixel column as a blue filter B is denoted as "Gb" for the purpose of illustration.

In the following description, a pixel provided with a red filter R is denoted as an R pixel, a pixel provided with a green filter Gr or Gb is denoted as an Gr or Gb pixel or correctively denoted as a G pixel, and a pixel provided with a blue filter B is denoted as an B pixel. The R pixel, the G pixel, and the B pixel are pixels mainly for outputting color information and may be referred to as "color pixel" or "RGB pixel". Further, a pixel provided with a white filter W is denoted as a W pixel. The W pixel is a pixel for mainly outputting luminance information and may be referred to as "white pixel" or "clear pixel".

Note that the W pixel is a pixel that directly detects an incident light without color separation. The W pixel is featured in that the transmission wavelength range is wider and the sensitivity is higher than those of the R pixel, the G pixel, and the B pixel in the spectral sensitivity characteristic, and, the W pixel has the wavelength widest full width at half maximum of a transmission wavelength range in the spectral sensitivity characteristic, for example. Typically, the transmission wavelength range in the spectral sensitivity characteristic of the W pixel covers the transmission wavelength range in the spectral sensitivity characteristic of the R pixel, the G pixel, and the B pixel.

Note that, in FIG. 3, the R pixel is labeled with the reference 22R, the Gr pixel is labeled with the reference 22Gr, the Gb pixel is labeled with the reference 22Gb, the B pixel is labeled with the reference 22B, and the W pixel is labeled with the reference 22W. In the following description, when collectively illustrated, the R pixel 22R, the Gr pixel 22Gr, the Gb pixel 22Gb, the B pixel 22B, and the W pixel 22W may be denoted as the pixel 22.

In the color filter arrangement illustrated in FIG. 3, out of 16 pixels included in the unit block 20, the ratio of the R pixel, the G pixel, the B pixel, and W pixel is R:G:B:W=1:2:1:12. Such color filter arrangement having 12 W pixels in the unit block 20 is denoted as "RGBW12 arrangement" in this specification. In the RGBW12 arrangement, the ratio of color pixels and W pixels is RGB:W=1:3. The feature of the RGBW12 arrangement may be that every color pixel of the R pixel, the G pixel, and the B pixel is surrounded by the W pixels and that the occupancy ratio of the W pixels in all the pixels is 3/4.

As illustrated in FIG. 3, each of the four unit pixels 12 forming the unit block 20 includes one color pixel and three W pixels. The unit pixel 12 including the R pixel 22R and the unit pixel 12 including the B pixel 22B are arranged at positions in one of the diagonal directions of the unit block 20. Further, the unit pixel 12 including the Gr pixel 22Gr and the unit pixel 12 including the Gb pixel 22Gb are arranged at positions in the other diagonal direction of the unit block 20. The positions of color pixels within the unit pixel 12 are the same for all the unit pixels 12. Further, four pixels 22 included in each of the unit pixels 12 share one floating diffusion portion FD as described above. The floating diffusion portion FD may be arranged at the center of the unit pixel 12.

With such arrangement of color pixels and the floating diffusion portion FD, the R pixel 22R, the Gr pixel 22Gr, the Gb pixel 22Gb, and the B pixel 22B are arranged equally to the Bayer arrangement in terms of the positional relationship of being connected to the floating diffusion portion FD of the unit pixels 12 to which respective pixels belong.

By arranging the pixels 22 in such a way, it is possible to add a signal of one color pixel and signals of three W pixels when adding (also referred to as binning) signals in the floating diffusion portion FD for the purpose of improvement of sensitivity. In such a case, while the signal of the color pixel is mixed with the signals of the W pixels, signals of color pixels of different colors are separated from each other. It is therefore possible to obtain independent information on a color pixel for each color and ensure color reproducibility.

Next, the configuration of floating diffusion portions FD shared by four pixels 22 included in a single unit pixel 12 will be described in more detail with reference to FIG. 4.

FIG. 4 illustrates a plan layout of four pixels 22a, 22b, 22c, and 22d included in one unit pixel 12. The pixel 22a includes the photoelectric converter PDA and the transfer transistor M1A. The pixel 22b includes the photoelectric converter PDB and the transfer transistor M1B. The pixel 22c includes the photoelectric converter PDC and the transfer transistor M1C. The pixel 22d includes the photoelectric converter PDD and the transfer transistor M1D. The transfer transistors M1A, M1B, M1C, and M1D include gate electrodes (transfer gates) 24A, 24B, 24C, and 24D, respectively.

In the floating diffusion portion FD, it is desirable to reduce the area as much as possible to reduce the parasitic capacitance. This is because, when noise on the post-stage of a pixel amplifier (source follower circuit) is converted into the input of the floating diffusion portion FD (converted into the number of electrons), the noise converted into the number of electrons appears to be large and the S/N ratio decreases when the parasitic capacitance of the floating diffusion portion FD is large. The reduced S/N ratio deteriorates the lowest object illuminance that indicates the ability of capturing a darker place.

In the present embodiment, in terms of reducing the capacitance of the floating diffusion portion FD, the floating diffusion portion FD is formed of a single continuous impurity diffusion region and shared by four pixels 22. This is because, when the floating diffusion portion FD is formed by two or more impurity floating diffusion regions being connected by interconnections, the parasitic capacitance coupled to the interconnections is superimposed, and the capacitance of the floating diffusion portion FD increases.

Further, in the present embodiment, the gate width directions of the transfer transistors M1A, M1B, M1C, and M1D are the same, and the direction of charge transfer from the photoelectric converter PD to the floating diffusion portion FD is limited to the vertical direction in FIG. 4. This is because of consideration for a situation where, in terms of improvement of the charge transfer performance from the photoelectric converter PD to the floating diffusion portion FD or the like, ion implantation in forming the photoelectric converter PD or the floating diffusion portion FD may be performed from a direction diagonal to the normal direction of the substrate. With the gate width direction of the four transfer transistors M1A, M1B, M1C, and M1D being the same, variation of the transfer performance of these transistors can be reduced.

Figure 5:
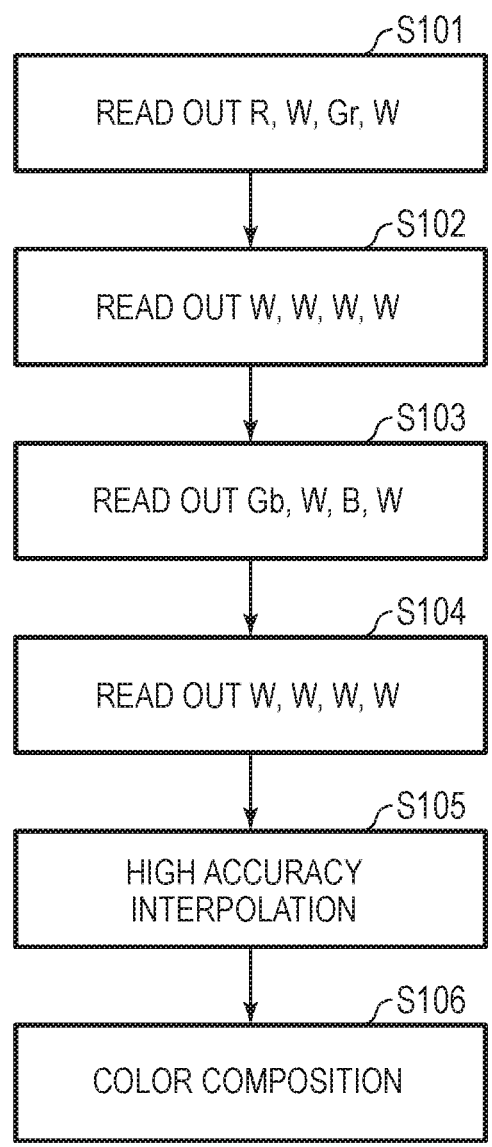
FIG. 5 and FIG. 6 are flowcharts illustrating methods of driving the imaging device according to the first embodiment of the present disclosure.
Figure 6:
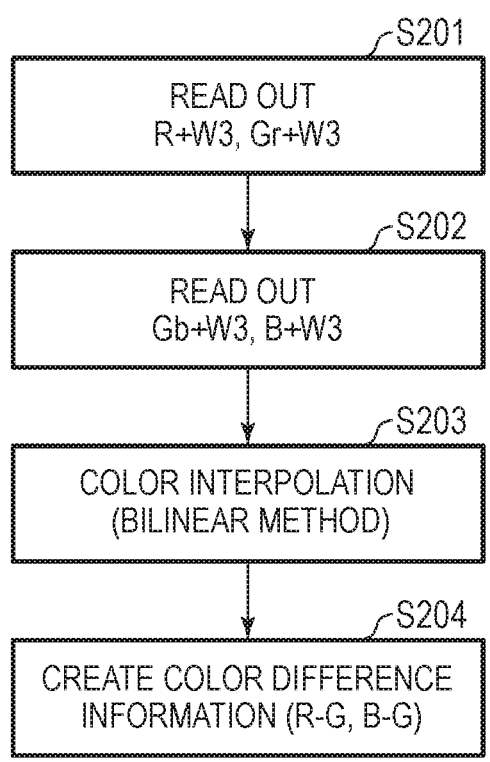
Figure 7:
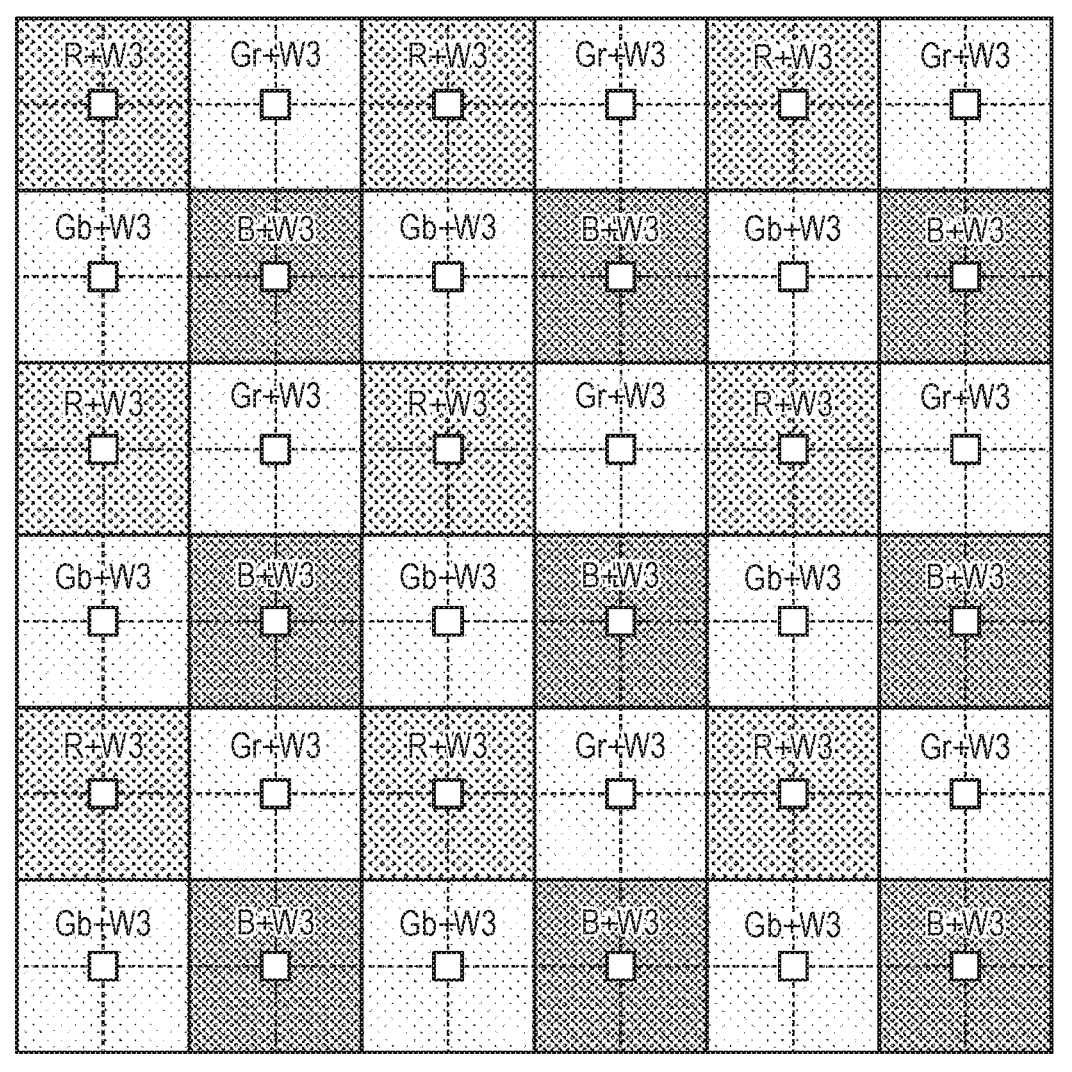
Figure 8:
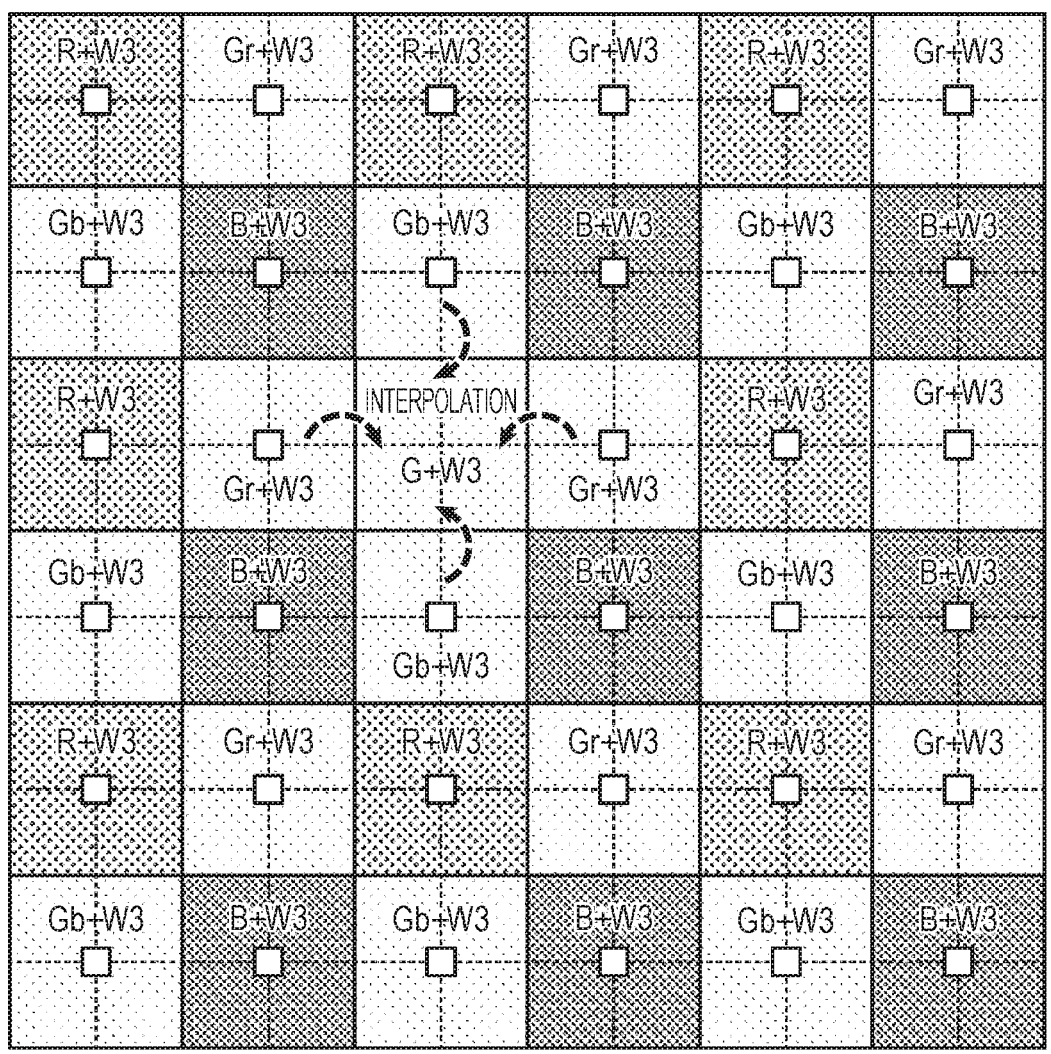
FIG. 8 and FIG. 9 are diagrams illustrating color interpolation methods in the method of driving the imaging device according to the first embodiment of the present disclosure.
Figure 9:
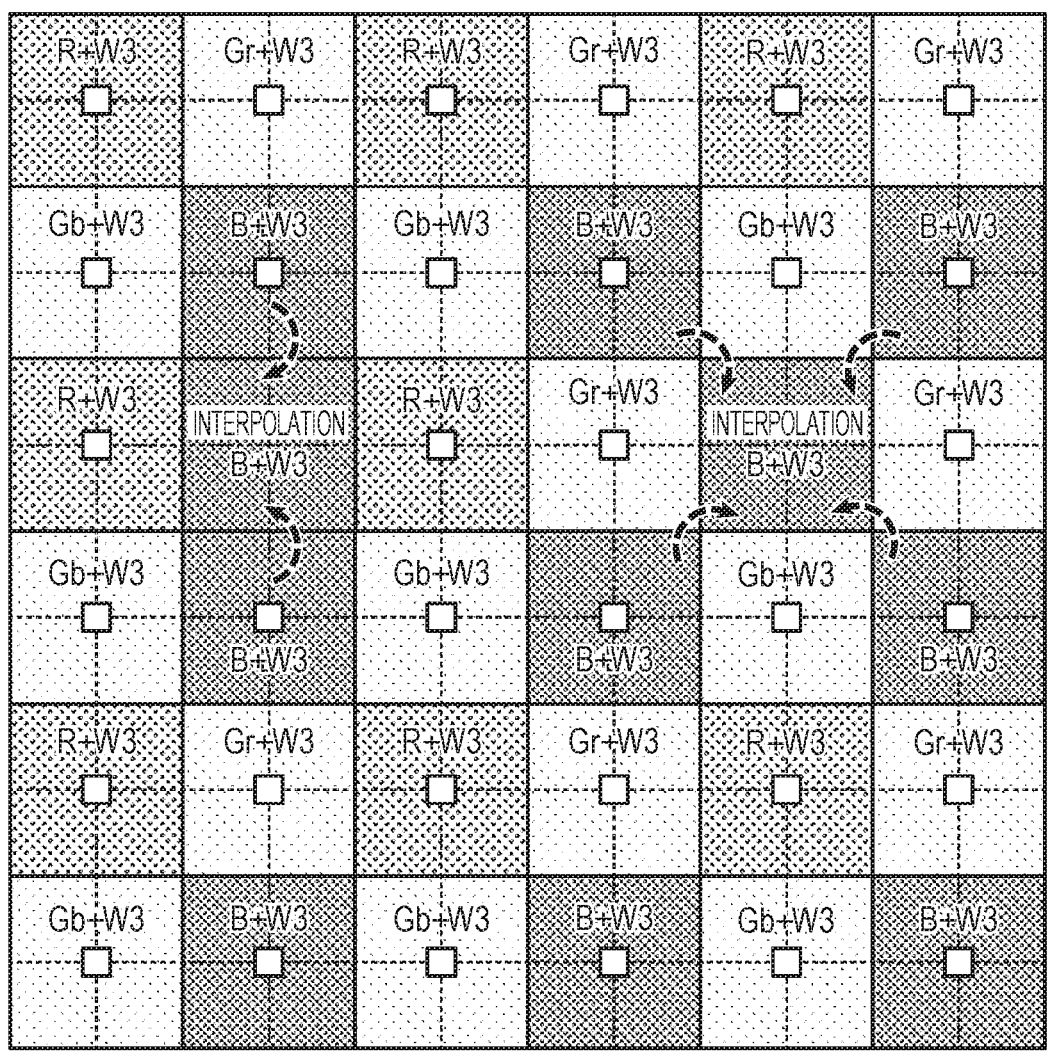

Next, a method of driving the imaging device according to the present embodiment will be described with reference to FIG. 5 to FIG. 9. FIG. 5 and FIG. 6 are flowcharts illustrating methods of driving the imaging device according to the present embodiment. FIG. 7 is a diagram illustrating data arrangement when pixel addition is performed on a unit pixel basis in the method of driving the imaging device according to the present embodiment. FIG. 8 and FIG. 9 are diagrams illustrating color interpolation methods in the method of driving the imaging device according to the present embodiment.

In the present embodiment, a driving example of reading out data from each of the pixels 22 and a driving example of reading out added data from each of the unit pixels 12 will be described.

FIG. 5 illustrates a driving example when readout of data is performed from each of the pixels 22 (first driving example). In the first driving example, data readout operations are performed sequentially on a pixel row basis. In this example, a case where data are read out from 16 pixels 22 belonging to the unit block 20 illustrated in FIG. 3 will be described as an example. In the unit block 20 illustrated in FIG. 3, the R pixel 22R, the W pixel 22W, the Gr pixel 22Gr, and the W pixel 22W are arranged in this order on the first pixel row. Further, four W pixels 22W are arranged on the second pixel row and the fourth pixel row. Further, the Gb pixel 22Gb, the W pixel 22W, the B pixel 22B, and the W pixel 22W are arranged in this order on the third pixel row.

First, readout of data from the R pixel 22R, the W pixel 22W, the Gr pixel 22Gr, and the W pixel 22W is performed on the first pixel row (step S101). Specifically, after each floating diffusion portion FD is reset, the transfer transistor M1A of each unit pixel 12 is driven to transfer charge of the photoelectric converter PDA to the floating diffusion portion FD and read out the data of the R pixel 22R and the data of the Gr pixel 22Gr. Subsequently, after each floating diffusion portion FD is reset, the transfer transistor M1B of each unit pixel 12 is driven to transfer charge of the photoelectric converter PDB to the floating diffusion portion FD and read out data of the W pixel 22W on the second pixel column and data of the W pixel 22W on the fourth pixel column.

Next, readout of data from the W pixel 22W, the W pixel 22W, the W pixel 22W, and the W pixel 22W is performed on the second pixel row (step S102). Specifically, after each floating diffusion portion FD is reset, the transfer transistor M1C of each unit pixel 12 is driven to transfer charge of the photoelectric converter PDA to the floating diffusion portion FD and read out the data of the W pixel 22W on the first pixel column and the data of the W pixel 22W on the third pixel column. Subsequently, after each floating diffusion portion FD is reset, the transfer transistor M1D of each unit pixel 12 is driven to transfer charge of the photoelectric converter PDB to the floating diffusion portion FD and read out data of the W pixel 22W on the second pixel column and data of the W pixel 22W on the fourth pixel column.

Next, readout of data from the Gb pixel 22Gb, the W pixel 22W, the B pixel 22B, and the W pixel 22W is performed on the third pixel row (step S103). Specifically, after each floating diffusion portion FD is reset, the transfer transistor M1A of each unit pixel 12 is driven to transfer charge of the photoelectric converter PDA to the floating diffusion portion FD and read out the data of the Gb pixel 22Gb and the data of the B pixel 22B. Subsequently, after each floating diffusion portion FD is reset, the transfer transistor M1B of each unit pixel 12 is driven to transfer charge of the photoelectric converter PDB to the floating diffusion portion FD and read out data of the W pixel 22W on the second pixel column and data of the W pixel 22W on the fourth pixel column.

Next, readout of data from the W pixel 22W, the W pixel 22W, the W pixel 22W, and the W pixel 22W is performed on the fourth pixel row (step S104). Specifically, after each floating diffusion portion FD is reset, the transfer transistor M1C of each unit pixel 12 is driven to transfer charge of the photoelectric converter PDA to the floating diffusion portion FD and read out the data of the W pixel 22W on the first pixel column and the data of the W pixel 22W on the third pixel column. Subsequently, after each floating diffusion portion FD is reset, the transfer transistor M1D of each unit pixel 12 is driven to transfer charge of the photoelectric converter PDB to the floating diffusion portion FD and read out data of the W pixel 22W on the second pixel column and data of the W pixel 22W on the fourth pixel column.

Next, a high accuracy interpolation process (step S105) and a color composition process (step S106) are performed on the read out data. Note that a known method, for example, the method disclosed in Japanese Patent Application Laid-Open No. 2016-213715 can be applied for the high accuracy interpolation process and the color composition process. In the present embodiment, since the RGBW12 arrangement is used as color filter arrangement, an image with high sensitivity can be acquired by using data of W pixels.

FIG. 6 illustrates a driving example when readout of added data is performed from each of the unit pixels 12 (second driving example). In the second driving example, data readout operations are performed sequentially on a unit pixel row basis. In this example, a case where added data are read out from four unit pixels 12 belonging to the unit block 20 illustrated in FIG. 3 will be described as an example. In the unit block 20 illustrated in FIG. 3, the unit pixel 12 including one R pixel 22R and three W pixels 22W and the unit pixel 12 including one Gr pixel 22Gr and three W pixels 22W are arranged on the first unit pixel row. Further, the unit pixel 12 including one Gb pixel 22Gb and three W pixels 22W and the unit pixel 12 including one B pixel 22B and three W pixels 22W are arranged on the second unit pixel row. According to the second driving example, an image with higher sensitivity can be acquired than in the first driving example.

First, readout of data (R+W3) in which a signal of the R pixel 22R and signals of the three W pixels 22W are added and data (Gr+W3) in which a signal of the Gr pixel 22Gr and signals of the three W pixels 22W are added is performed on the first unit pixel row (step S201). Specifically, after each floating diffusion portion FD is reset, the transfer transistors M1A, M1B, M1C, and M1D of each unit pixel 12 are driven to transfer charges of the photoelectric converters PDA, PDB, PDC, and PDD to the floating diffusion portion FD. Thereby, data (R+W3) in which the signal of R pixel 22R and the signals of the three W pixels 22W are added is read out from the unit pixel 12 on the first unit pixel column. Further, data (Gr+W3) in which the signal of Gr pixel 22Gr and the signals of the three W pixels 22W are added is read out from the unit pixel 12 on the second unit pixel column.

Next, readout of data (Gb+W3) in which a signal of the Gb pixel 22Gb and signals of the three W pixels 22W are added and data (B+W3) in which a signal of the B pixel 22B and signals of the three W pixels 22W are added is performed on the second unit pixel row (step S202). Specifically, after each floating diffusion portion FD is reset, the transfer transistors M1A, M1B, M1C, and M1D of each unit pixel 12 are driven to transfer charges of the photoelectric converters PDA, PDB, PDC, and PDD to the floating diffusion portion FD. Thereby, data (Gb+W3) in which the signal of Gb pixel 22Gb and the signals of the three W pixels 22W are added is read out from the unit pixel 12 on the first unit pixel column. Further, data (B+W3) in which the signal of B pixel 22B and the signals of the three W pixels 22W are added is read out from the unit pixel 12 on the second unit pixel column.

FIG. 7 illustrates data arrangement when readout of a region of six unit pixel rows by six unit pixel columns is performed by using the second driving example. All the data read out from each of the unit pixels 12 will be data of a color pixel+W pixel×3, as illustrated in FIG. 7.

When data is read out by performing pixel addition in such a way and if noise levels occurring in the floating diffusion portions FD are the same regardless of whether or not the addition is performed, the charge amount transferred to the floating diffusion portion FD is approximately three to four times, and thus the SN ratio can be improved.

Next, a demosaic process is performed on the read out data. The arrangement of data read out by the second driving example is the same arrangement as the Bayer arrangement while data of W pixels are added, as illustrated in FIG. 7. Therefore, when performing a color developing process in the second driving example, it is possible to perform interpolation of respective color pixels by the same method as that for the Bayer arrangement.

In a demosaic process, first, a color interpolation process is performed by using data read out in step S201 and step S202 (step S203). Here, an example using a bilinear method will be described as a method of the color interpolation process. The bilinear method is a method for calculating an interpolation value by averaging data of pixels of the same color arranged nearby.

Note that, in the following description, the unit pixel 12 from which data of R+W3 is read out may be denoted as "R+W3 unit pixel". Further, the unit pixel 12 from which data of Gr+W3 is read out may be denoted as "Gr+W3 unit pixel". Further, the unit pixel 12 from which data of Gb+W3 is read out may be denoted as "Gb+W3 unit pixel". Further, the unit pixel 12 from which data of B+W3 is read out may be denoted as "B+W3 unit pixel". Further, the unit pixel 12 from which data of Gr+W3 is read out and the unit pixel 12 from which data of Gr+W3 is read out may be collectively denoted as "G+W3 unit pixel".

First, a color interpolation method of data of G (green) will be described. As described above, since the Gr pixel and the Gb pixel have substantially the same characteristics, the Gr pixels and the Gb pixels form G pixels arranged in a checkered pattern when viewed as a whole. Therefore, an interpolation value of G (interpolation G+W3) in the R+W3 unit pixel and the B+W3 unit pixel can be calculated by averaging data of four G+W3 unit pixels located on the upper side, the lower side, the left side, and the right side, as illustrated in FIG. 8.

Next, a color interpolation method of data of B (blue) will be described. Since, unlike the G+W3 unit pixel, one B+W3 unit pixel is included in each unit block 20, it is necessary to use a color interpolation method different from the color interpolation method of the interpolation a G+W3 described above. That is, with respect to Gr+W3 unit pixel, since B+W3 unit pixels are located on the upper side and the lower side thereof, an interpolation value of B (interpolation B+W3) can be calculated by averaging data of these two B+W3 unit pixels, as illustrated with two arrows on the left side in FIG. 9. Similarly, with respect to a Gb+W3 unit pixel, since B+W3 unit pixels are located on the left side and the right side thereof, an interpolation value of B (interpolation B+W3) can be calculated by averaging data of these two B+W3 unit pixels. Further, with respect to an R+W3 unit pixel, since B+W3 unit pixels are located in four diagonal directions, an interpolation value of B (interpolation B+W3) can be calculated by averaging data of these four B+W3 unit pixels, as illustrated with four arrows on the right side in FIG. 9.

With respect to data of R (red), the color interpolation can be performed by using the same scheme as the color interpolation method of data of B (interpolation B+W3).

Color interpolation processes are performed on all the unit pixels 12 in such a way, and thus each of unit pixels 12 will have three types of values, namely, data of R (R+W3), data of G (G+W3), and data of B (B+W3).

Next, color difference information at each unit pixel 12 is created (step S204). That is, the color value is calculated from three types of values provided in the unit pixel 12 with respect to each of the unit pixels 12. While each of data of R+W3, G+W3, and B+W3 includes color information, data of W is dominant in a signal intensity, it is not preferable to directly use each data in terms of color reproducibility.

Accordingly, color information of each unit pixel 12, that is, color difference data between R and G and color difference data between B and G are acquired by performing calculation below.

Color difference $(R-G)=(R+W3)-(G+W3)$

Color difference $(B-G)=(B+W3)-(G+W3)$

Further, as another method, it is possible to acquire color information by performing calculation below. Here, each of K1, K2, K3, K4, and K5 is a constant and varies in accordance with the spectral sensitivity characteristic of each color or a property of a light source.

Luminance: $Y=K1\times(R+W3)+K2(G+W3)+K3(B+W3)$

Color difference: $PR=K4\times((R+W3)-Y)$

Color difference: $PB=K5\times((R+W3)-Y)$

In such a way, by extracting color information from data of the unit pixel 12 in which data of W is mixed, it is possible to improve color reproducibility.

In the present embodiment, in the imaging device having color filters of the RGBW12 arrangement, the unit pixel 12 is formed of one color pixel and three W pixels that share the floating diffusion portion FD and the output unit, and thus improvement of sensitivity by binning can be realized. Further, each of the unit pixels 12 includes only one color pixel, and thus the color reproducibility is not reduced by the binning.

To examine the effect and advantage of the present embodiment, evaluation capturing related to the dark view performance was performed by using the drive method described above. As a comparative example, the same evaluation capturing was performed also in an imaging device having color filter arrangement of RGGB arrangement (normal Bayer arrangement). As a result, in the imaging device of the present embodiment using the RGBW12 arrangement, with respect to the lowest object illuminance (brightness at which a ratio of an output signal and noise for a captured object is 1:1), capturing was successfully performed at up to half the brightness of the case of the comparative example. Further, by further performing pixel addition, capturing was successfully performed up to further half the brightness, and preferable color reproducibility can be obtained.

As described above, according to the present embodiment, it is possible to improve sensitivity without deteriorating color reproducibility and acquire an image with a high S/N ratio.

Second Embodiment

Figure 10:
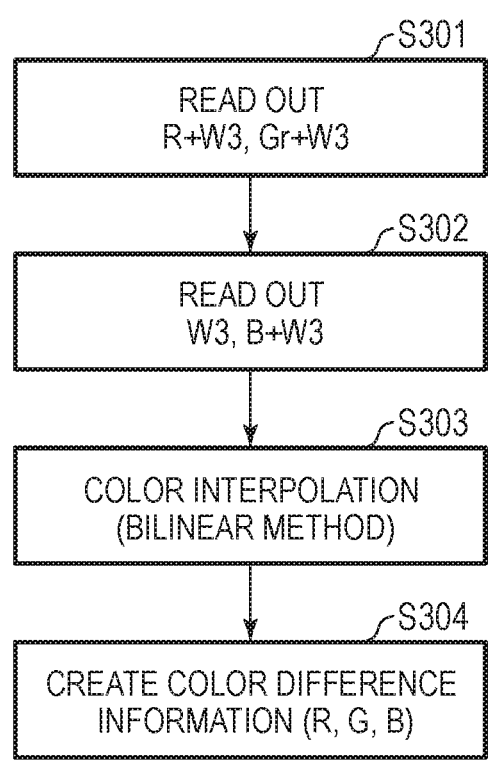
FIG. 10 is a flowchart illustrating a method of driving an imaging device according to a second embodiment of the present disclosure.
Figure 11:
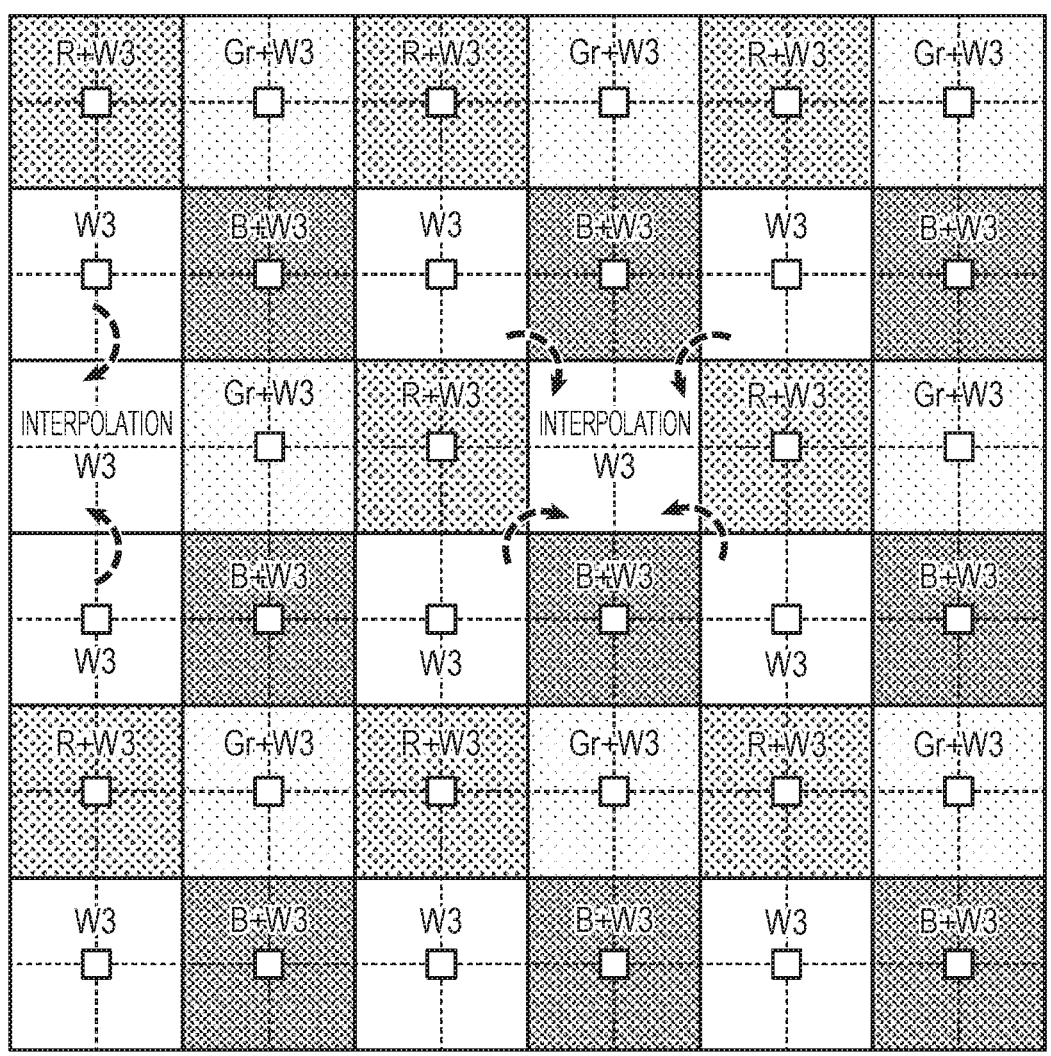
FIG. 11 is a diagram illustrating a color interpolation method in the method of driving the imaging device according to the second embodiment of the present disclosure.

An imaging device and a method of driving the same according to a second embodiment of the present disclosure will be described with reference to FIG. 10 and FIG. 11. The same component as that in the imaging device according to the first embodiment is labeled with the same reference, and the description thereof will be omitted or simplified. FIG. 10 is a flowchart illustrating the method of driving the imaging device according to the present embodiment. FIG. 11 is a diagram illustrating a color interpolation method in the method of driving the imaging device according to the present embodiment.

In the present embodiment, an example of acquiring data of W (W3) in addition to three types of data of R (R+W3), data of G (G+W3), and data of B (B+W3) to obtain color data of primary colors instead of color difference information will be described.

In the method of driving the imaging device according to the present embodiment, as illustrated in FIG. 10, data readout operations are performed sequentially on a unit pixel row basis in the same manner as the second drive method of the first embodiment.

First, readout of data (R+W3) in which a signal of an R pixel 22R and signals of three W pixels 22W are added and data (Gr+W3) in which a signal of a Gr pixel 22Gr and signals of three W pixels 22W are added is performed on the first unit pixel row (step S301). Specifically, after each floating diffusion portion FD is reset, the transfer transistors M1A, M1B, M1C, and M1D of each unit pixel 12 are driven to transfer charges of the photoelectric converters PDA, PDB, PDC, and PDD to the floating diffusion portion FD. Thereby, data (R+W3) in which the signal of the R pixel 22R and the signals of the three W pixels 22W are added is read out from the unit pixel 12 on the first unit pixel column. Further, data (Gr+W3) in which the signal of the Gr pixel 22Gr and the signals of the three W pixels 22W are added is read out from the unit pixel 12 on the second unit pixel column.

Next, readout of data (W3) in which only signals of three W pixels 22W are added and data (B+W3) in which a signal of a B pixel 22B and signals of three W pixels 22W are added is performed on the second unit pixel row (step S302). Specifically, after each floating diffusion portion FD is reset, the transfer transistors M1B, M1C, and M1D of each unit pixel 12 are driven to transfer charges of the photoelectric converters PDB, PDC, and PDD to the floating diffusion portion FD. Thereby, data (W3) in which the signal of the three W pixels 22W are added is read out from the unit pixel 12 on the second unit pixel column. Subsequently, the transfer transistor M1A of each unit pixel 12 is driven to transfer charge of the photoelectric converter PDA to the floating diffusion portion FD. Thereby, data (B+W3) in which the signal of the B pixel 22B and the signals of the three W pixels 22W are added is read out from the unit pixel 12 on the second unit pixel column. Note that the transfer transistor M1A of the unit pixel 12 on the first unit pixel column and the transfer transistor M1A of the unit pixel 12 on the second unit pixel column may be controlled by different control signals to selectively drive the transfer transistor M1A of the unit pixel 12 on the second unit pixel column.

When data is read out by performing pixel addition in such a way and if noise levels occurring in the floating diffusion portions FD are the same regardless of whether or not the addition is performed, the charge amount transferred to the floating diffusion portion FD is approximately three to four times, and thus the SN ratio can be improved.

Next, a color interpolation process is performed by using data read out in step S301 and step S302 (step S303). Note that, in the following description, the unit pixel 12 from which data of W3 is read out may be denoted as "W3 unit pixel".

In the present embodiment, since data (G+W3) of G is not arranged in a checkered pattern, a color interpolation process is performed by using a bilinear method also for data of G as with data of R and data of B. Further, in the present embodiment, the same color interpolation process as that for color data is performed for data of W (W3). One W3 unit pixel is included in each unit block 20 as with the R+W3 unit pixel, the Gr+W3 unit pixel, and B+W3 unit pixel. Therefore, the same color interpolation process as that for data of R, data of G, and data of B can be performed also for such data of W.

That is, with respect to an R+W3 unit pixel, since W3 unit pixels are located on the upper side and the lower side thereof, an interpolation value of W (interpolation W3) can be calculated by averaging data of these two W3 unit pixels, as illustrated with two arrows on the left side in FIG. 11. Similarly, with respect to a B+W3 unit pixel, since W3 unit pixels are located on the left side and the right side thereof, an interpolation value of W (interpolation W3) can be calculated by averaging data of these two W3 unit pixels. Further, with respect to a Gr+W3 unit pixel, since W3 unit pixels are located in four diagonal directions, an interpolation value of W (interpolation W3) can be calculated by averaging data of these four W3 unit pixels, as illustrated with four arrows on the right side in FIG. 11.

Color interpolation processes are performed on all the unit pixels 12 in such a way, and thus each of unit pixels 12 will have four types of values, namely, data of R (R+W3), data of G (G+W3), data of B (B+W3), and data of W (W3).

Next, color difference information for each unit pixel 12 is created (step S304). That is, for each of the unit pixels 12, values of R, G, and B are acquired, respectively, by performing calculation below by using four types of values provided in the unit pixel.

$$R=(R+W3)-(W3)$$

$$G=(G+W3)-(W3)$$

$$B=(B+W3)-(W3)$$

Further, for the luminance Y at each unit pixel 12, data of W (W3) of the unit pixel may be used. Alternatively, the luminance Y can be acquired by performing calculation below. Here, each of K6, K7, K8, and K9 is a constant.

$$Y=K6\times(R+W3)+K7\times(Gr+W3)+K8\times(B+W3)+K9\times(W3)$$

The final pixel value at unit pixel 12 can be calculated by multiplying the values of R, G, and B by the luminance Y.

As described above, according to the present embodiment, it is possible to improve sensitivity without deteriorating color reproducibility and acquire an image with a high S/N ratio.

Third Embodiment

Figure 12:
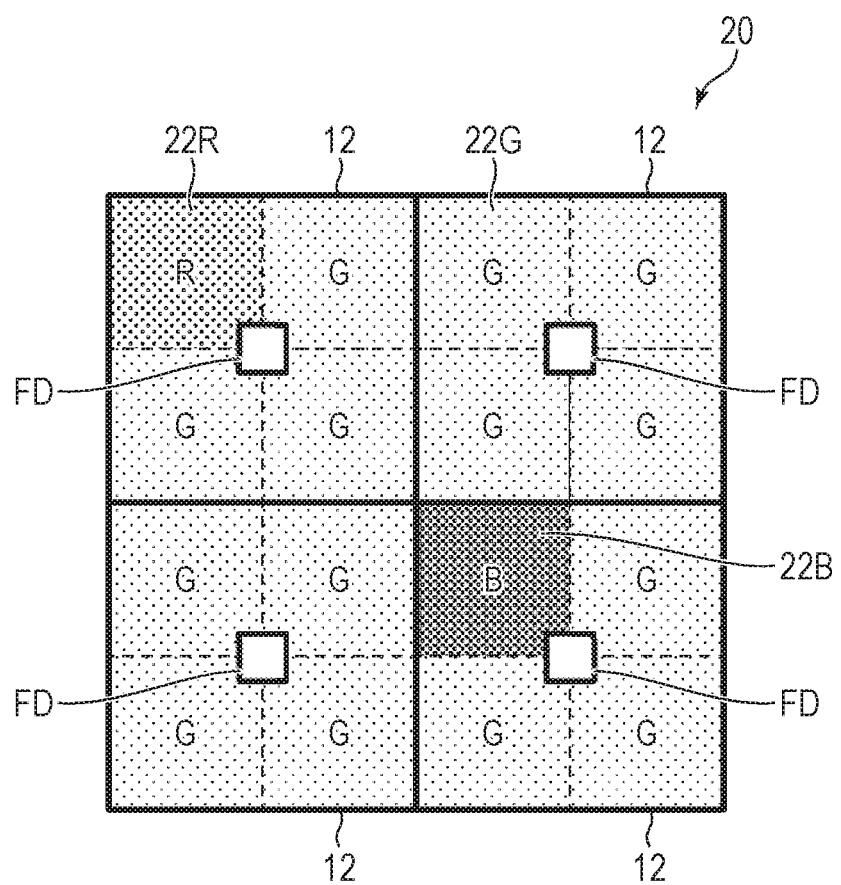
FIG. 12 is a plan view illustrating a unit block of a pixel region in an imaging device according to a third embodiment of the present disclosure.

An imaging device and a method of driving the same according to a third embodiment of the present disclosure will be described with reference to FIG. 12. The same component as that in the imaging device according to the first and second embodiments is labeled with the same reference, and the description thereof will be omitted or simplified. FIG. 12 is a plan view illustrating a unit block of a pixel region in the imaging device according to the present embodiment.

While W pixels are used as pixels from which luminance information is acquired in the first and second embodiments, it is possible to use G pixels instead of W pixels. In the present embodiment, an example in which G pixels are used as pixels from which luminance information is acquired will be described.

The unit blocks 20 illustrated in FIG. 12 are repeatedly arranged in the row direction and the column direction, and thereby the pixel region 10 of the imaging device according to the present embodiment is formed. That is, the unit block 20 is the minimum repetition unit in the pixel region 10.

Each of 16 pixels arranged in the unit block 20 includes a color filter having a predetermined spectral sensitivity characteristic. Each of the characters "R", "G", and "B" illustrated in FIG. 12 represents a spectral sensitivity characteristic of a color filter provided to the corresponding pixel. That is, "R" represents a red filter, "G" represents a green filter, and "B" represents a blue filter. In FIG. 12, an R pixel is denoted as the reference 22R, a G pixel is denoted as the reference 22G, and a B pixel is denoted as the reference 22B. In the color filter arrangement of the present embodiment illustrated in FIG. 12, out of 16 pixels included in the unit block 20, the ratio of the R pixel, the G pixel, and the B pixel is R:G:B=1:14:1.

Further, one unit block 20 includes one unit pixel 12 including one R pixel 22R and three G pixels 22G, one unit pixel 12 including one B pixel 22B and three G pixels 22G, and two unit pixels 12 including four G pixels 22G. It is possible to acquire data of R+G3, data of B+G3, and data of G4 from these unit pixels 12 by performing pixel addition.

Therefore, also in the imaging device according to the present embodiment, a color difference signal can be acquired by performing calculation below after interpolating three types of values of R+G3, B+G3, and G4 for each unit pixel 12 by the bilinear method in the same manner as in the first embodiment.

$$\text{Color difference }(R-G)=(R+G3)-(G4)$$

$$\text{Color difference }(B-G)=(B+G3)-(G4)$$

As described above, according to the present embodiment, it is possible to improve sensitivity without deteriorating color reproducibility and acquire an image with a high S/N ratio.

Fourth Embodiment

Figure 13:
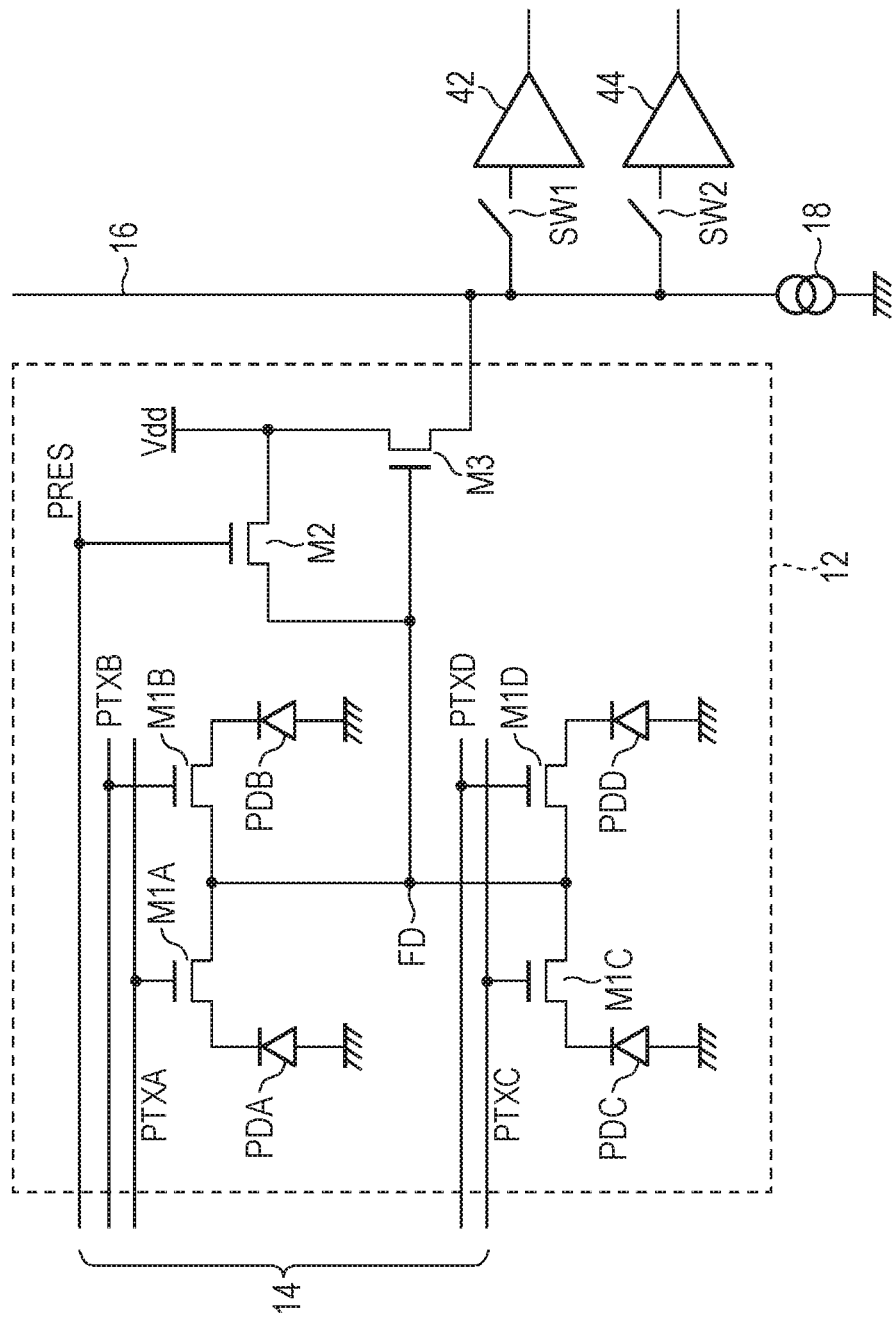
FIG. 13 is a circuit diagram illustrating a configuration example of a unit pixel of an imaging device according to a fourth embodiment of the present disclosure.
Figure 14:
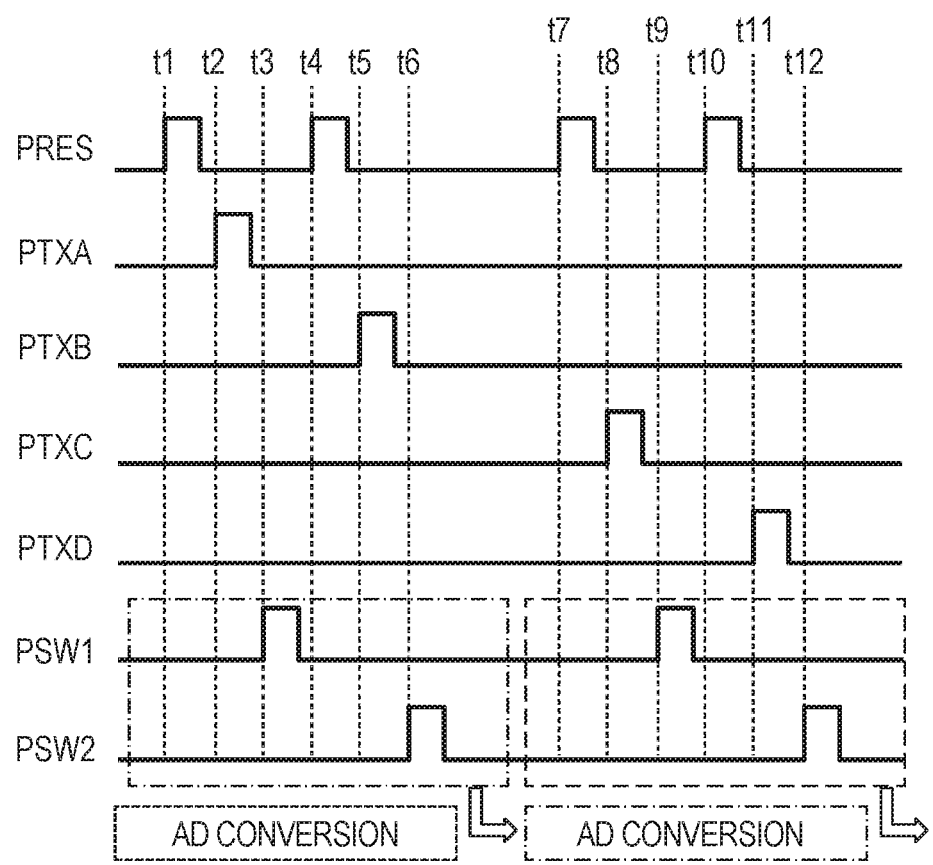
FIG. 14 and FIG. 15 are timing diagrams illustrating methods of driving the imaging device according to the fourth embodiment of the present disclosure.
Figure 15:
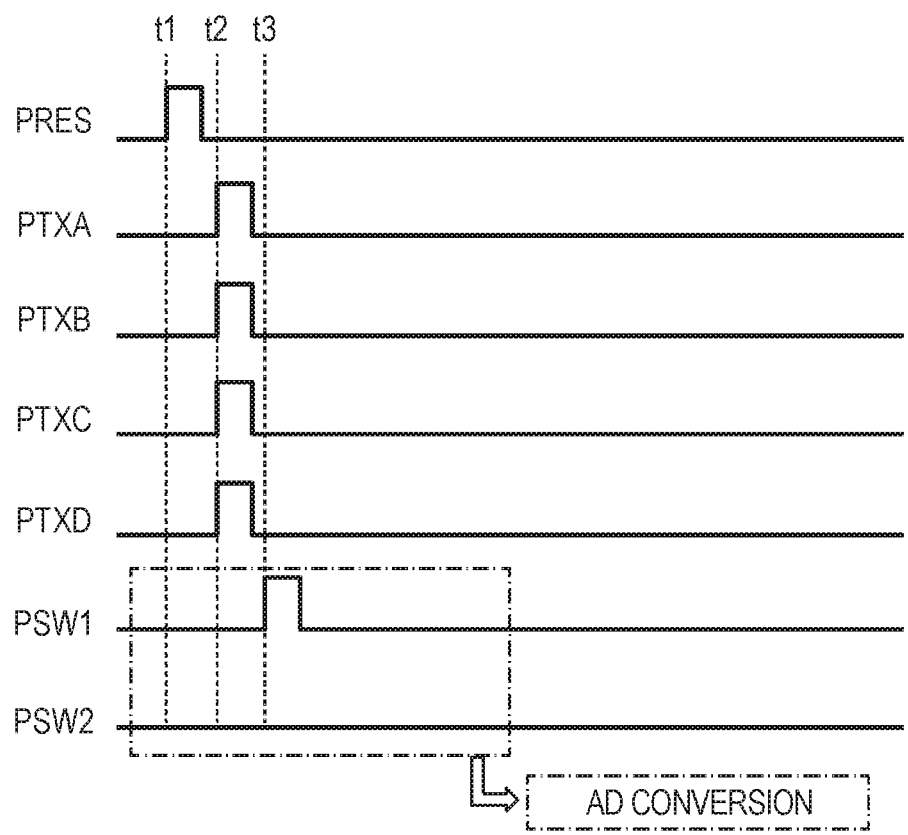

An imaging device and a method of driving the same according to a fourth embodiment of the present disclosure will be described with reference to FIG. 13 to FIG. 15. The same component as that in the imaging device according to the first to third embodiments is labeled with the same reference, and the description thereof will be omitted or simplified. FIG. 13 is a circuit diagram illustrating a configuration example of a unit pixel of the imaging device according to the present embodiment. FIG. 14 and FIG. 15 are timing diagrams illustrating methods of driving the imaging device according to the present embodiment.

As illustrated in FIG. 13, the imaging device according to the present embodiment is the same as the imaging device according to the first embodiment except that a column amplifier 44 is further connected to the output line 16 via the switch SW2. A signal output to the output line 16 is input to the column amplifier 44 via the switch SW2 and converted into a digital signal by an AD converter (not illustrated) arranged on the post-stage thereof. The switch SW2 and the column amplifier 44 are a part of the components of the readout circuit 40 as with the switch SW1 and the column amplifier 42.

Next, the method of driving the imaging device according to the present embodiment will be described with reference to FIG. 14 and FIG. 15. The timing diagrams of FIG. 14 and FIG. 15 indicate the control signals PRES, PTXA, PTXB, PTXC, and PTXD, a control signal PSW1 for the switch SW1, and a control signal PSW2 for the switch SW2. When each of these control signals is at a high (H) level, the corresponding transistor or switch is in an on-state, and when each of these control signals is at a low (L) level, the corresponding transistor or switch is in an off-state.

First, the driving example when readout of data is performed from each of the pixels 22 (first driving example) will be described with reference to FIG. 14.

At time t1, the vertical scanning circuit 30 controls the control signal PRES from the L level to the H level and then controls the control signal PRES from the H level to the L level. Thereby, during the period in which the control signal PRES is at the H level, the reset transistor M2 is in the on-state, and the floating diffusion portion FD is reset to a voltage in accordance with the voltage Vdd.

Next, at time t2, the vertical scanning circuit 30 controls the control signal PTXA from the L level to the H level and then controls the control signal PTXA from the H level to the L level. Thereby, during the period in which the control signal PTXA is at the H level, the transfer transistor M1A is in the on-state, and charge accumulated in the photoelectric converter PDA is transferred to the floating diffusion portion FD.

Next, at time t3, the control circuit 70 controls the control signal PSW1 from the L level to the H level and then controls the control signal PSW1 from the H level to the L level. Thereby, during the period in which the control signal PSW1 is at the H level, the switch SW1 is in the on-state, and a signal in accordance with the amount of charge accumulated in the photoelectric converter PDA is output from the amplifier transistor M3 to the column amplifier 42 via the output line 16 and the switch SW1. Then, the switch SW1 is turned off, and thereby an output signal from the amplifier transistor M3 is held in the column amplifier 42.

Next, at time t4, the vertical scanning circuit 30 controls the control signal PRES from the L level to the H level and then controls the control signal PRES from the H level to the L level. Thereby, during the period in which the control signal PRES is at the H level, the reset transistor M2 is in the on-state, and the floating diffusion portion FD is reset to the voltage in accordance with the voltage Vdd.

Next, at time t5, the vertical scanning circuit 30 controls the control signal PTXB from the L level to the H level and then controls the control signal PTXB from the H level to the L level. Thereby, during the period in which the control signal PTXB is at the H level, the transfer transistor M1B is in the on-state, and charge accumulated in the photoelectric converter PDB is transferred to the floating diffusion portion FD.

Next, at time t6, the control circuit 70 controls the control signal PSW2 from the L level to the H level and then controls the control signal PSW2 from the H level to the L level. Thereby, during the period in which the control signal PSW2 is at the H level, the switch SW2 is in the on-state, and a signal in accordance with the amount of charge accumulated in the photoelectric converter PDB is output from the amplifier transistor M3 to the column amplifier 44 via the output line 16 and the switch SW2. Then, the switch SW2 is turned off, and thereby an output signal from the amplifier transistor M3 is held in the column amplifier 44.

The signals held in the column amplifiers 42 and 44 are then converted into digital data, respectively, by an AD converter (not illustrated) arranged on the post-stage.

Next, at time t7, the vertical scanning circuit 30 controls the control signal PRES from the L level to the H level and then controls the control signal PRES from the H level to the L level. Thereby, during the period in which the control signal PRES is at the H level, the reset transistor M2 is in the on-state, and the floating diffusion portion FD is reset to the voltage in accordance with the voltage Vdd.

Next, at time t8, the vertical scanning circuit 30 controls the control signal PTXC from the L level to the H level and then controls the control signal PTXC from the H level to the L level. Thereby, during the period in which the control signal PTXC is at the H level, the transfer transistor M1C is in the on-state, and charge accumulated in the photoelectric converter PDC is transferred to the floating diffusion portion FD.

Next, at time t9, the control circuit 70 controls the control signal PSW1 from the L level to the H level and then controls the control signal PSW1 from the H level to the L level. Thereby, during the period in which the control signal PSW1 is at the H level, the switch SW1 is in the on-state, and a signal in accordance with the amount of charge accumulated in the photoelectric converter PDC is output from the amplifier transistor M3 to the column amplifier 42 via the output line 16 and the switch SW1. Then, the switch SW1 is turned off, and thereby an output signal from the amplifier transistor M3 is held in the column amplifier 42.

Next, at time t10, the vertical scanning circuit 30 controls the control signal PRES from the L level to the H level and then controls the control signal PRES from the H level to the L level. Thereby, during the period in which the control signal PRES is at the H level, the reset transistor M2 is in the on-state, and the floating diffusion portion FD is reset to the voltage in accordance with the voltage Vdd.

Next, at time t11, the vertical scanning circuit 30 controls the control signal PTXD from the L level to the H level and then controls the control signal PTXD from the H level to the L level. Thereby, during the period in which the control signal PTXD is at the H level, the transfer transistor M1D is in the on-state, and charge accumulated in the photoelectric converter PDD is transferred to the floating diffusion portion FD.

Next, at time t12, the control circuit 70 controls the control signal PSW2 from the L level to the H level and then controls the control signal PSW2 from the H level to the L level. Thereby, during the period in which the control signal PSW2 is at the H level, the switch SW2 is in the on-state, and a signal in accordance with the amount of charge accumulated in the photoelectric converter PDD is output from the amplifier transistor M3 to the column amplifier 44 via the output line 16 and the switch SW2. Then, the switch SW2 is turned off, and thereby an output signal from the amplifier transistor M3 is held in the column amplifier 44.

The signals held in the column amplifiers 42 and 44 are then converted into digital data, respectively, by an AD converter (not illustrated) arranged on the post-stage.

By driving the imaging device in such a way, it is possible to read out signals in accordance with the amount of charges accumulated in the four photoelectric converters PDA, PDB, PDC, and PDD, respectively and independently. Further, since signals of pixels arranged on the same pixel row are AD-converted at the same time, this simplifies alignment of data in a signal processing unit (not illustrated), and a process of color development or the like becomes easier.

Next, the driving example when readout of added data is performed from each of the unit pixel 12 (second driving example) will be described with reference to FIG. 15.

At time t1, the vertical scanning circuit 30 controls the control signal PRES from the L level to the H level and then controls the control signal PRES from the H level to the L level. Thereby, during the period in which the control signal PRES is at the H level, the reset transistor M2 is in the on-state, and the floating diffusion portion FD is reset to a voltage in accordance with the voltage Vdd.

Next, at time t2, the vertical scanning circuit 30 controls the control signals PTXA, PTXB, PTXC, and PTXD from the L level to the H level and then controls the control signals PTXA, PTXB, PTXC, and PTXD from the H level to the L level. Thereby, during the period in which the control signals PTXA, PTXB, PTXC, and PTXD are at the H level, the transfer transistors M1A, M1B, M1C, and M1D are in the on-state, and charges accumulated in the photoelectric converters PDA, PDB, PDC, and PDD are transferred to the floating diffusion portion FD.

Next, at time t3, the control circuit 70 controls the control signal PSW1 from the L level to the H level and then controls the control signal PSW1 from the H level to the L level. Thereby, during the period in which the control signal PSW1 is at the H level, the switch SW1 is in the on-state, and a signal in accordance with the total amount of charges accumulated in the photoelectric converters PDA, PDB, PDC, and PDD is output from the amplifier transistor M3 to the column amplifier 42. Then, the switch SW1 is turned off, and thereby an output signal from the amplifier transistor M3 is held in the column amplifier 42.

The signal held in the column amplifier 42 is then converted into digital data by an AD converter (not illustrated) arranged on the post-stage.

By driving the imaging device in such a way, it is possible to read out signals in accordance with the total amount of charges accumulated in the four photoelectric converters PDA, PDB, PDC, and PDD as pixel addition data. Thereby, capturing can be performed at up to half the brightness compared to the case where no pixel addition is performed, and preferable color reproducibility can be obtained.

As described above, according to the present embodiment, it is possible to improve sensitivity without deteriorating color reproducibility and acquire an image with a high S/N ratio.

Fifth Embodiment

Figure 16:
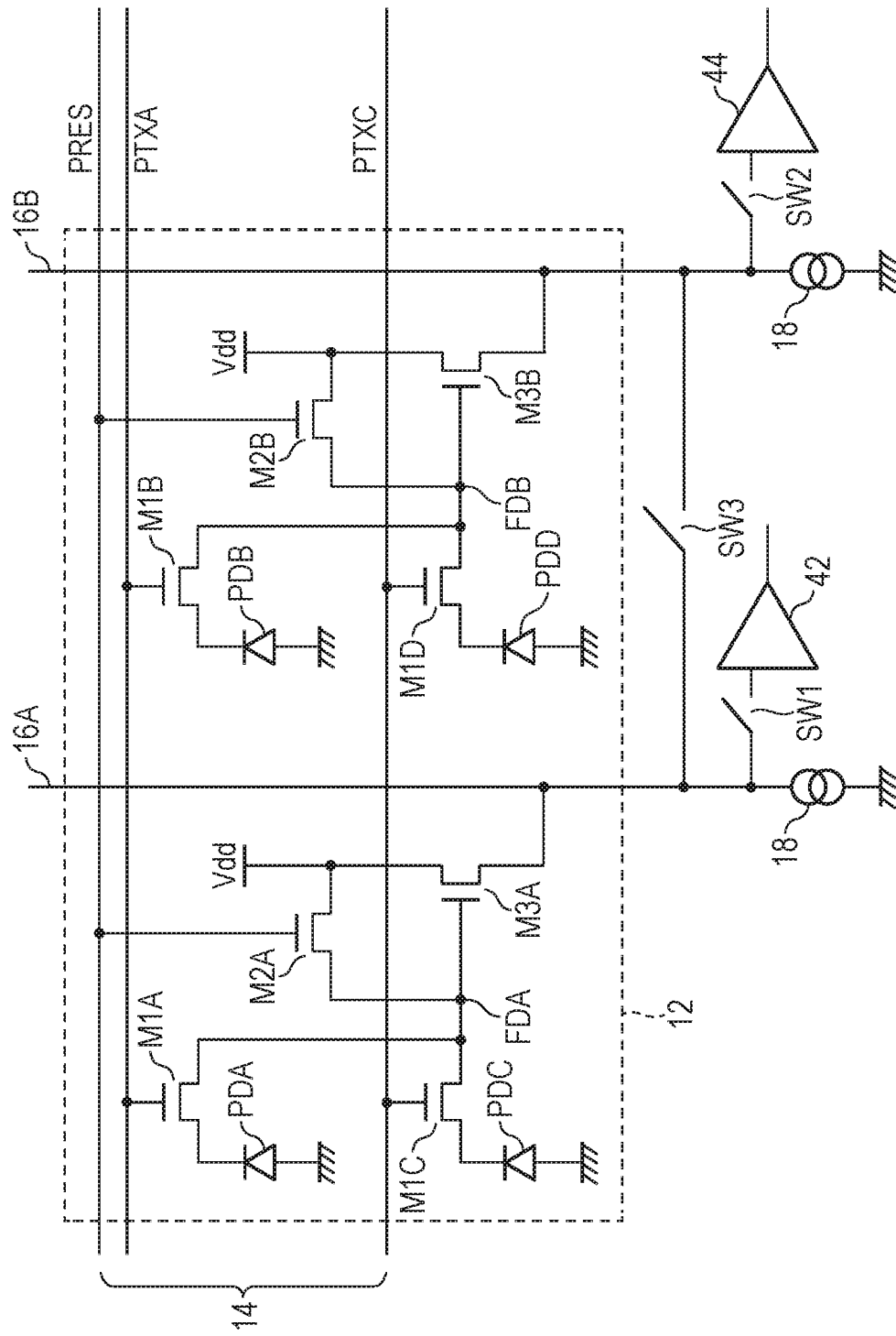
FIG. 16 is a circuit diagram illustrating a configuration example of a unit pixel of an imaging device according to a fifth embodiment of the present disclosure.
Figure 17:
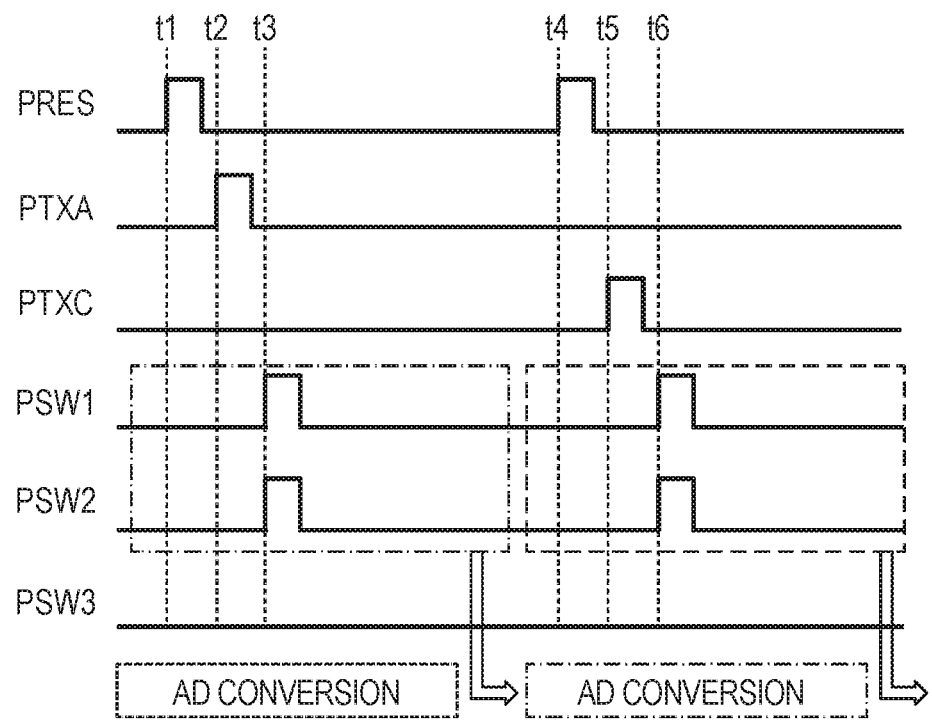
FIG. 17 and FIG. 18 are timing diagrams illustrating methods of driving the imaging device according to the fifth embodiment of the present disclosure.
Figure 18:
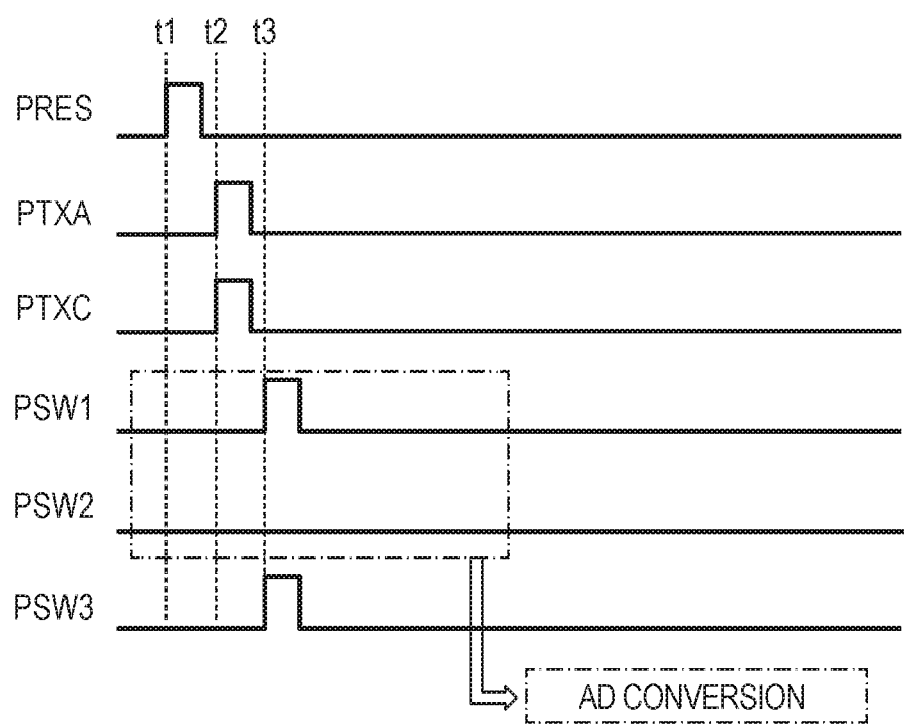

An imaging device and a method of driving the same according to a fifth embodiment of the present disclosure will be described with reference to FIG. 16 to FIG. 18. The same component as that in the imaging device according to the first to fourth embodiments is labeled with the same reference, and the description thereof will be omitted or simplified. FIG. 16 is a circuit diagram illustrating a configuration example of a unit pixel of the imaging device according to the present embodiment. FIG. 17 and FIG. 18 are timing diagrams illustrating methods of driving the imaging device according to the present embodiment.

In the imaging device according to the first to fourth embodiments, four pixels 22 forming one unit pixel 12 share the reset transistor M2, the amplifier transistor M3, and the output line 16. In contrast, in the imaging device according to the present embodiment, four pixels 22 forming one unit pixel 12 are divided into two sets each sharing the reset transistor M2, the amplifier transistor M3, and the output line 16 on a pixel column basis.

That is, as illustrated in FIG. 16, the unit pixel 12 of the present embodiment includes the photoelectric converters PDA, PDB, PDC, and PDD, the transfer transistors M1A, M1B, M1C, and M1D, reset transistors M2A and M2B, and amplifier transistors M3A and M3B.

In the photodiode of the photoelectric converter PDA, the anode is connected to the ground voltage node, and the cathode is connected to the source of the transfer transistor M1A. In the photodiode of the photoelectric converter PDC, the anode is connected to the ground voltage node, and the cathode is connected to the source of the transfer transistor M1C. The drains of the transfer transistors M1A and M1C are connected to the source of the reset transistor M2A and the gate of the amplifier transistor M3A. The connection node of the drains of the transfer transistors M1A and M1C, the source of the reset transistor M2A, and gate of the amplifier transistor M3A is a floating diffusion portion FDA. The source of the amplifier transistor M3A is connected to an output line 16A. The current source 18 is connected to the output line 16A.

In the photodiode of the photoelectric converter PDB, the anode is connected to the ground voltage node, and the cathode is connected to the source of the transfer transistor M1B. In the photodiode of the photoelectric converter PDD, the anode is connected to the ground voltage node, and the cathode is connected to the source of the transfer transistor M1D. The drains of the transfer transistors M1B and M1D are connected to the source of the reset transistor M2B and the gate of the amplifier transistor M3B. The connection node of the drains of the transfer transistors M1B and M1D, the source of the reset transistor M2B, and gate of the amplifier transistor M3B is a floating diffusion portion FDB. The source of the amplifier transistor M3B is connected to an output line 16B. The current source 18 is connected to the output line 16B.

The column amplifier 42 is connected to the output line 16A via the switch SW1. The column amplifier 44 is connected to the output line 16B via the switch SW2. Further, a switch SW3 is connected between the output line 16A and the output line 16B. The switch SW3 is a switch used for artificially averaging a signal output from the amplifier transistor M3A and a signal output from the amplifier transistor M3B. The switches SW1, SW2, and SW3 and the column amplifiers 42 and 44 are a part of the components of the readout circuit 40.

In the case of the unit pixel 12 configured as illustrated in FIG. 16, the control line 14 arranged on each row of the pixel region 10 includes three signal lines that supply the control signals PTXA, PTXC, and PRES. The signal line that supplies the control signal PTXA is connected to the gates of the transfer transistors M1A and M1B of the unit pixels 12 belonging to the corresponding row, respectively, to form a signal line common to these unit pixels 12. The signal line that supplies the control signal PTXC is connected to the gates of the transfer transistors M1C and M1D of the unit pixels 12 belonging to the corresponding row, respectively, to form a signal line common to these unit pixels 12. The signal line that supplies the control signal PRES is connected to the gates of the reset transistors M2 of the unit pixels 12 belonging to the corresponding row, respectively, to form a signal line common to these unit pixels 12.

Other features of the imaging device according to the present embodiment are the same as those of the imaging device according to the first embodiment.

Next, the method of driving the imaging device according to the present embodiment will be described with reference to FIG. 17 and FIG. 18. The timing diagrams of FIG. 17 and FIG. 18 indicate the control signals PRES, PTXA, and PTXC, a control signal PSW1 for the switch SW1, a control signal PSW2 for the switch SW2, and a control signal PSW3 for the switch SW3. When each of these control signals is at a high (H) level, the corresponding transistor or switch is in an on-state, and when each of these control signals is at a low (L) level, the corresponding transistor or switch is in an off-state.

First, the driving example when readout of data is performed from each of the pixels 22 (first driving example) will be described with reference to FIG. 17.

At time t1, the vertical scanning circuit 30 controls the control signal PRES from the L level to the H level and then controls the control signal PRES from the H level to the L level. Thereby, during the period in which the control signal PRES is at the H level, the reset transistors M2A and M2B are in the on-state, and the floating diffusion portions FDA and FDB are reset to a voltage in accordance with the voltage Vdd.

Next, at time t2, the vertical scanning circuit 30 controls the control signal PTXA from the L level to the H level and then controls the control signal PTXA from the H level to the L level. Thereby, during the period in which the control signal PTXA is at the H level, the transfer transistors M1A and M1B are in the on-state, charge accumulated in the photoelectric converter PDA is transferred to the floating diffusion portion FDA, and charge accumulated in the photoelectric converter PDB is transferred to the floating diffusion portion FDB.

Next, at time t3, the control circuit 70 controls the control signal PSW1 from the L level to the H level and then controls the control signal PSW1 from the H level to the L level. Thereby, during the period in which the control signal PSW1 is at the H level, the switch SW1 is in the on-state, and a signal in accordance with the amount of charge accumulated in the photoelectric converter PDA is output from the amplifier transistor M3A to the column amplifier 42 via the output line 16A and the switch SW1. Then, the switch SW1 is turned off, and thereby an output signal from the amplifier transistor M3A is held in the column amplifier 42.

Similarly, at time t3, the control circuit 70 controls the control signal PSW2 from the L level to the H level and then controls the control signal PSW2 from the H level to the L level. Thereby, during the period in which the control signal PSW2 is at the H level, the switch SW2 is in the on-state, and a signal in accordance with the amount of charge accumulated in the photoelectric converter PDB is output from the amplifier transistor M3B to the column amplifier 44 via the output line 16B and the switch SW2. Then, the switch SW2 is turned off, and thereby an output signal from the amplifier transistor M3B is held in the column amplifier 44.

The signals held in the column amplifiers 42 and 44 are then converted into digital data, respectively, by an AD converter (not illustrated) arranged on the post-stage.

Next, at time t4, the vertical scanning circuit 30 controls the control signal PRES from the L level to the H level and then controls the control signal PRES from the H level to the L level. Thereby, during the period in which the control signal PRES is at the H level, the reset transistors M2A and M2B are in the on-state, and the floating diffusion portions FDA and FDB are reset to the voltage in accordance with the voltage Vdd.

Next, at time t5, the vertical scanning circuit 30 controls the control signal PTXC from the L level to the H level and then controls the control signal PTXC from the H level to the L level. Thereby, during the period in which the control signal PTXC is at the H level, the transfer transistors M1C and M1D are in the on-state, charge accumulated in the photoelectric converter PDC is transferred to the floating diffusion portion FDA, and charge accumulated in the photoelectric converter PDD is transferred to the floating diffusion portion FDB.

Next, at time t6, the control circuit 70 controls the control signal PSW1 from the L level to the H level and then controls the control signal PSW1 from the H level to the L level. Thereby, during the period in which the control signal PSW1 is at the H level, the switch SW1 is in the on-state, and a signal in accordance with the amount of charge accumulated in the photoelectric converter PDC is output from the amplifier transistor M3A to the column amplifier 42 via the output line 16A and the switch SW1. Then, the switch SW1 is turned off, and thereby an output signal from the amplifier transistor M3A is held in the column amplifier 42.

Similarly, at time t6, the control circuit 70 controls the control signal PSW2 from the L level to the H level and then controls the control signal PSW2 from the H level to the L level. Thereby, during the period in which the control signal PSW2 is at the H level, the switch SW2 is in the on-state, and a signal in accordance with the amount of charge accumulated in the photoelectric converter PDD is output from the amplifier transistor M3B to the column amplifier 44 via the output line 16B and the switch SW2. Then, the switch SW2 is turned off, and thereby an output signal from the amplifier transistor M3B is held in the column amplifier 44.

The signals held in the column amplifiers 42 and 44 are then converted into digital data, respectively, by an AD converter (not illustrated) arranged on the post-stage.

By driving the imaging device in such a way, it is possible to read out signals, respectively, independently in accordance with the amount of charges accumulated in the four photoelectric converters PDA, PDB, PDC, and PDD. Further, since signals of pixels arranged on the same pixel row are AD-converted at the same time, this simplifies alignment of data in a signal processing unit (not illustrated), and a process of color development or the like becomes easier.

Next, the driving example when readout of added data is performed from each of the unit pixels 12 (second driving example) will be described with reference to FIG. 18.

At time t1, the vertical scanning circuit 30 controls the control signal PRES from the L level to the H level and then controls the control signal PRES from the H level to the L level. Thereby, during the period in which the control signal PRES is at the H level, the reset transistors M2A and M2B are in the on-state, and the floating diffusion portions FDA and FDB are reset to the voltage in accordance with the voltage Vdd.

Next, at time t2, the vertical scanning circuit 30 controls the control signals PTXA and PTXC from the L level to the H level and then controls the control signals PTXA and PTXC from the H level to the L level. Thereby, during the period in which the control signals PTXA and PTXC are at the H level, the transfer transistors M1A and M1C are in the on-state, and charges accumulated in the photoelectric converters PDA and PDC are transferred to the floating diffusion portion FDA. Further, during the period in which the control signals PTXA and PTXC are at the H level, the transfer transistors M1B and M1D are in the on-state, and charges accumulated in the photoelectric converters PDB and PDD are transferred to the floating diffusion portion FDB.

Thereby, a signal in accordance with the total amount of charges accumulated in the photoelectric converters PDA and PDC is output to the output line 16A. Further, a signal in accordance with the total amount of charges accumulated in the photoelectric converters PDB and PDD is output to the output line 16B.

Next, at time t3, the control circuit 70 controls the control signals PSW1 and PSW3 from the L level to the H level and then controls the control signals PSW1 and PSW3 from the H level to the L level. Thereby, the output line 16A and the output line 16B are connected via the switch SW3, and the signal in accordance with the total amount of charges accumulated in the photoelectric converters PDA and PDC and the signal in accordance with the total amount of charges accumulated in the photoelectric converters PDB and PDD are artificially averaged. The signal averaged in such a way is then output to the column amplifier 42 via the switch SW1. Then, the switch SW1 is turned off, and thereby the averaged signal is held in the column amplifier 42.

The signal held in the column amplifier 42 is then converted into digital data by an AD converter (not illustrated) arranged on the post-stage.

By driving the imaging device in such a way, it is possible to average and read out pixel addition data in accordance with the total amount of charges accumulated in the photoelectric converters PDA and PDC and pixel addition data in accordance with the total amount of charges accumulated in the photoelectric converters PDB and PDD. Thereby, capturing can be performed at up to half the brightness compared to the case where no pixel addition is performed, and preferable color reproducibility can be obtained.

As described above, according to the present embodiment, it is possible to improve sensitivity without deteriorating color reproducibility and acquire an image with a high S/N ratio.

Sixth Embodiment

Figure 19:
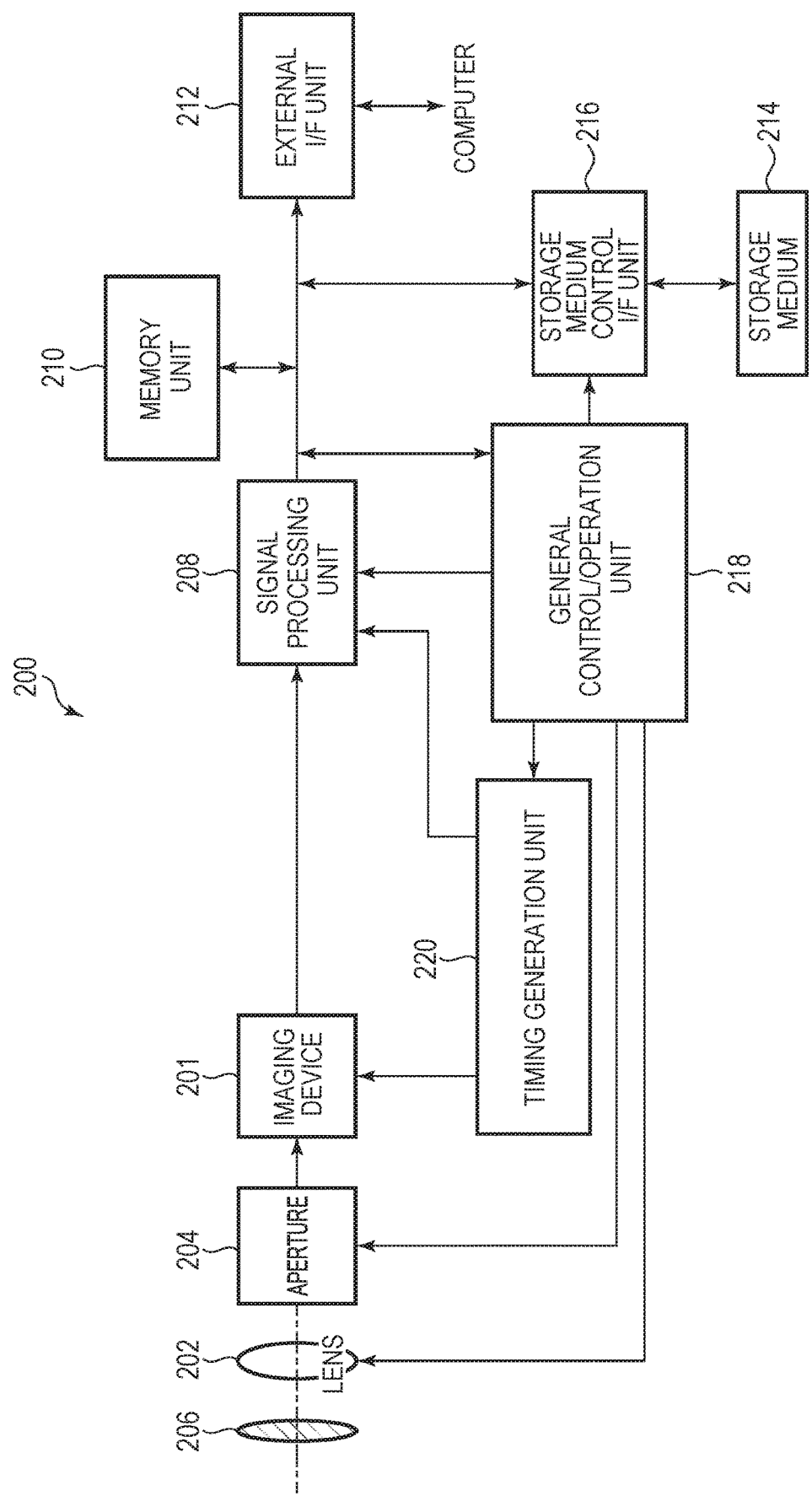
FIG. 19 is a block diagram illustrating a general configuration of an imaging system according to a sixth embodiment of the present disclosure.

An imaging system according to a sixth embodiment of the present disclosure will be described with reference to FIG. 19. FIG. 19 is a block diagram illustrating a general configuration of the imaging system according to the present embodiment.

The imaging device 100 described in the above first to fifth embodiments can be applied to various imaging systems. An example of applicable imaging systems may be a digital still camera, a digital camcorder, a surveillance camera, a copying machine, a fax machine, a mobile phone, an on-vehicle camera, an observation satellite, or the like. Further, a camera module including an optical system such as a lens and an imaging device is also included in the imaging system. FIG. 19 illustrates a block diagram of a digital still camera as an example out of these examples.

An imaging system 200 illustrated as an example in FIG. 19 includes an imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is the imaging device 100 described in any of the first to fifth embodiments and converts an optical image captured by the lens 202 into image data.

The imaging system 200 further includes a signal processing unit 208 that performs processing on an output signal output from the imaging device 201. The signal processing unit 208 has a digital signal processing unit and performs operations to perform various correction or compression on the signal output from the imaging device 201 if necessary to output image data. When the signal output from the imaging device 201 is an analog signal, the signal processing unit 208 may include an analog-to-digital converter circuit on the pre-stage of the digital signal processing unit. The signal processing unit 208 may be provided on a semiconductor substrate on which the imaging device 201 is provided or may be provided on a different semiconductor substrate from the semiconductor substrate on which the imaging device 201 is provided.

Further, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Further, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

As described above, according to the present embodiment, the imaging system to which the imaging device 100 according to the first to fifth embodiments is applied can be realized.

Seventh Embodiment

Figure 20A:
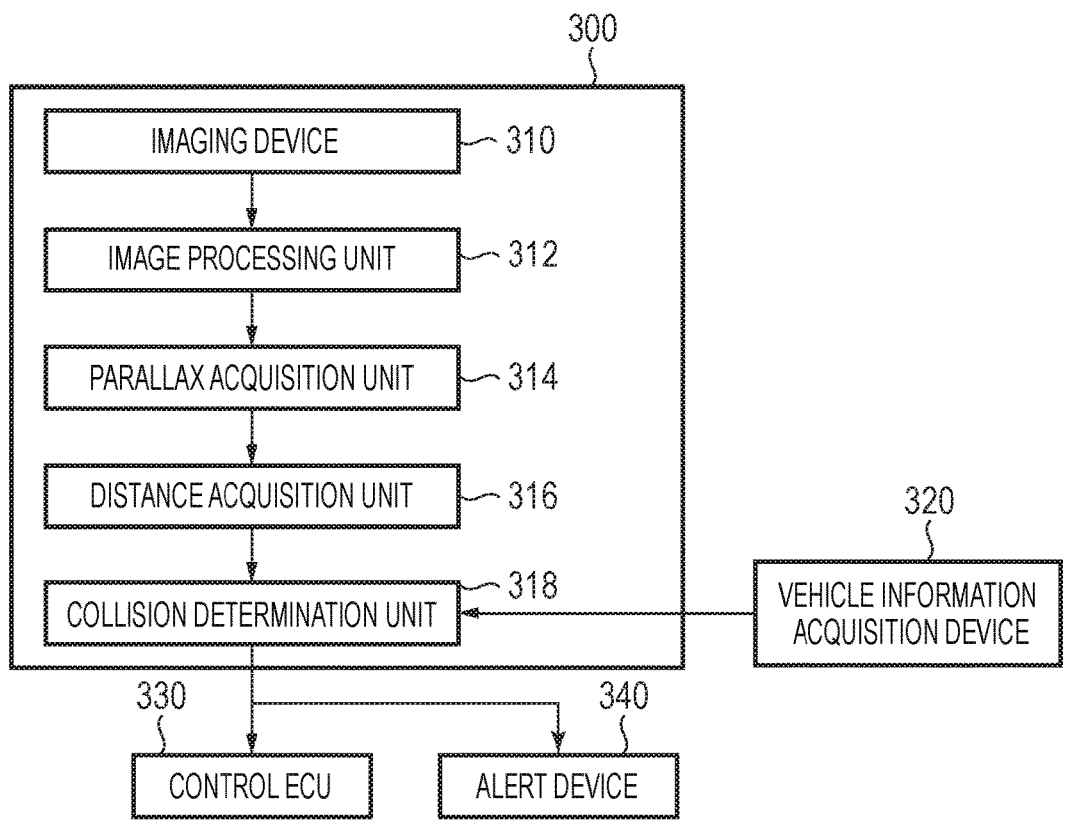
FIG. 20A is a diagram illustrating a configuration example of an imaging system according to a seventh embodiment of the present disclosure.
Figure 20B:
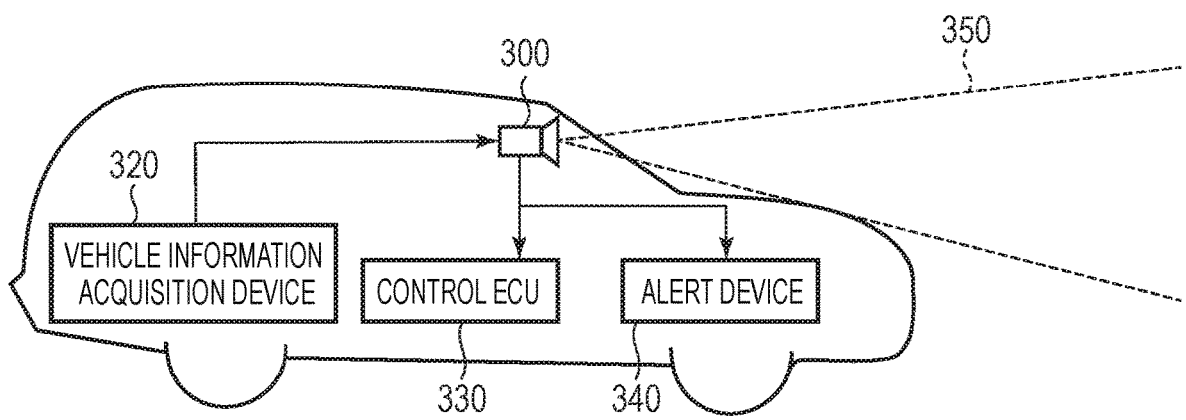
FIG. 20B is a diagram illustrating a configuration example of a movable object according to the seventh embodiment of the present disclosure.

An imaging system and a movable object according to a seventh embodiment of the present disclosure will be described with reference to FIG. 20A and FIG. 20B. FIG. 20A is a diagram illustrating a configuration of the imaging system according to the present embodiment. FIG. 20B is a diagram illustrating a configuration of the movable object according to the present embodiment.

FIG. 20A illustrates an example of an imaging system related to an on-vehicle camera. An imaging system 300 includes an imaging device 310. The imaging device 310 is the imaging device 100 described in any of the above first to fifth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition device that acquires distance information on the distance to the object. That is, the distance information is information on a parallax, a defocus amount, a distance to an object, or the like. The collision determination unit 318 may use any of the distance information to determine the collision possibility. The distance information acquisition device may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 20B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present disclosure is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present disclosure.

Further, while the case of the RGBW12 arrangement as the color filter arrangement has been illustrated as one example in the embodiments described above, the color filter arrangement is not necessarily required to be the RGBW12 arrangement. For example, CMYW arrangement formed of a C pixel having a CF of cyan color, an M pixel having a CF of magenta color, a Y pixel having a CF of yellow color, and a W pixel may be applied as the color filter arrangement.

Further, while a device intended for capturing an image, that is, an imaging device has been illustrated as one example in the first to fifth embodiments described above, an application example of the present disclosure is not limited to an imaging device. For example, in the case of application to a device intended for ranging as described in the above seventh embodiment, it is not always necessary to output an image. In such a case, such a device can be said to be a photoelectric conversion device that converts optical information into a predetermined electric signal. An imaging device is one of the photoelectric conversion devices.

Further, the imaging systems illustrated in the above sixth and seventh embodiments are examples of an imaging system to which the photoelectric conversion device of the present disclosure may be applied, and an imaging system to which the photoelectric conversion device of the present disclosure can be applied is not limited to the configuration illustrated in FIG. 19 and FIG. 20A.

Note that all the embodiments described above are mere embodied examples in implementing the present disclosure, and the technical scope of the present disclosure should not be construed in a limiting sense by these embodiments. That is, the present disclosure can be implemented in various forms without departing from the technical concept thereof or the primary feature thereof.

According to the present disclosure, it is possible to improve sensitivity without deteriorating color reproducibility and acquire an image with a high S/N ratio.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-246927, filed Dec. 28, 2018, which is hereby incorporated by reference herein in its entirety.

What is claimed is:
1. An imaging device comprising:
a plurality of pixels each including a photoelectric converter, a holding portion to which charge generated in the photoelectric converter is transferred, and an output unit that outputs a signal in accordance with an amount of charge held in the holding portion; and
a control unit that controls readout of signals from the plurality of pixels,
wherein the plurality of pixels includes:
a plurality of first pixels each configured to output a signal in accordance with a light of a first wavelength range,
a plurality of second pixels each configured to output a signal in accordance with a light of a second wavelength range that is different from the first wavelength range,
a plurality of third pixels each configured to output a signal in accordance with a light of a third wavelength range that is different from the first wavelength range and the second wavelength range, and
a plurality of fourth pixels each configured to output a signal in accordance with a light of a fourth wavelength range that is different from the first wavelength range, the second wavelength range, and the third wavelength range,
wherein the plurality of pixels forms:

a plurality of first unit pixels each including the first pixels and the second pixel but not including the third pixel, wherein the first pixels and the second pixel share the holding portion, a plurality of second unit pixels each including the first pixels and the third pixel but not including the second pixel, wherein the first pixels and the third pixel share the holding portion, a plurality of third unit pixels each including the first pixels and the fourth pixel but not including the second pixel and the third pixel, wherein the first pixels and the fourth pixel share the holding portion, wherein the control unit reads out, from each of the plurality of first unit pixels, a signal in which signals of the first pixels and a signal of the second pixel are added in the holding portion, wherein the control unit is configured to read out, from each of a part of the plurality of third unit pixels, a signal in which signals of the first pixels are added in the holding portion by transferring charges of the photoelectric converters of the first pixels to the holding portion without transferring charge of the photoelectric converter of the fourth pixel, and wherein the control unit is further configured to read out, from each of the second unit pixels, a signal in which signals of the first pixels and a signal of the third pixel are added in the holding portion.

2. The imaging device according to claim 1, wherein the control unit is further configured to read out, from each of the third unit pixels, a signal in which signals of the first pixels and a signal of the fourth pixel are added in the holding portion.

3. The imaging device according to claim 1,
wherein each of the first unit pixels includes three of the first pixels and one of the second pixels,
wherein each of the second unit pixels includes three of the first pixels and one of the third pixels, and
wherein each of the third unit pixels includes three of the first pixels and one of the fourth pixels.

4. The imaging device according to claim 3, wherein four of the pixels forming each of the first unit pixels, the second unit pixels, and the third unit pixels are arranged in a matrix of two rows by two columns.

5. The imaging device according to claim 1, wherein each of the plurality of second pixels, the plurality of third pixels, and the plurality of fourth pixels is surrounded by the first pixels.

6. The imaging device according to claim 1, wherein the plurality of first pixels are W pixels, the W pixel being a pixel provided with a white filter.

7. The imaging device according to claim 1,
wherein the plurality of first pixels are W pixels, the W pixel being a pixel provided with a white filter,
wherein the plurality of second pixels are R pixels, the R pixel being a pixel provided with a red filter,
wherein the plurality of third pixels are B pixels, the B pixel being a pixel provided with a blue filter, and
wherein the plurality of fourth pixels are G pixels, the G pixel being a pixel provided with a green filter.

8. The imaging device according to claim 7, wherein the plurality of first unit pixels, the plurality of second unit pixels, and the plurality of third unit pixels are arranged in Bayer arrangement in accordance with colors of color pixels included in each of the unit pixels.

9. The imaging device according to claim 1,
wherein the plurality of first pixels are W pixels, the W pixel being a pixel provided with a white filter,
wherein the plurality of second pixels are C pixels, the C pixel being a pixel provided with a cyan filter,
wherein the plurality of third pixels are M pixels, the M pixel being a pixel provided with a magenta filter, and
wherein the plurality of fourth pixels are Y pixels, the Y pixel being a pixel provided with a yellow filter.

10. The imaging device according to claim 1, wherein the holding portion is a floating diffusion portion.

11. An imaging system comprising:
the imaging device according to claim 1; and
a signal processing unit that processes signals output from the pixels of the imaging device.

12. A movable object comprising:
the imaging device according to claim 1;
a distance information acquisition device that acquires distance information on a distance to an object, from a parallax image based on signals output from the pixels of the imaging device; and
a control device that controls the movable object based on the distance information.

13. An imaging device comprising:
a plurality of pixels each including a photoelectric converter, a holding portion to which charge generated in the photoelectric converter is transferred, and an output unit that outputs a signal in accordance with an amount of charge held in the holding portion; and
a control unit that controls readout of signals from the plurality of pixels,
wherein the plurality of pixels includes:
a plurality of first pixels each configured to output a signal in accordance with a light of a first wavelength range,
a plurality of second pixels each configured to output a signal in accordance with a light of a second wavelength range that is different from the first wavelength range, and
a plurality of third pixels each configured to output a signal in accordance with a light of a third wavelength range that is different from the first wavelength range and the second wavelength range,
wherein the plurality of pixels forms:
a plurality of first unit pixels each including the first pixels and the second pixel but not including the third pixel, wherein the first pixels and the second pixel share the holding portion,
a plurality of second unit pixels each including the first pixels and the third pixel but not including the second pixel, wherein the first pixel and the third pixel share the holding portion, and a plurality of fourth unit pixels each including the first pixels but not including the second pixels and the third pixels, wherein the first pixels share the holding portion, and
wherein the control unit is configured to:
read out, from each of the plurality of first unit pixels, a signal in which signals of the first pixels and a signal of the second pixel are added in the holding portion, and
read out, from each of the plurality of second unit pixels, a signal in which signals of the first pixels and a signal of the third pixel are added in the holding portion.

14. The imaging device according to claim 13, wherein the control unit is configured to read out, from each of the plurality of fourth unit pixels, a signal in which signals of the plurality of first pixels are added in the holding portion.

15. The imaging device according to claim 13,
wherein each of the first unit pixels includes three of the first pixels and one of the second pixels,
wherein each of the second unit pixels includes three of the first pixels and one of the third pixels, and wherein each of the fourth unit pixels includes four of the first pixels.

16. The imaging device according to claim 13,
wherein the plurality of first pixels are G pixels, the G pixel being a pixel provided with a green filter,
wherein the plurality of second pixels are R pixels, the R pixel being a pixel provided with a red filter, and
wherein the plurality of third pixels are B pixels, the B pixel being a pixel provided with a blue filter.

17. A signal processing device comprising a signal processing unit that processes signals output from an imaging device including a plurality of pixels including a first pixel having higher sensitivity than a second to fourth pixels, the second pixel configured to output a signal including color information of a first color, the third pixel configured to output a signal including color information of a second color that is different from the first color, and the fourth pixel configured to output a signal including color information of a third color that is different from the first color and the second color,
wherein the imaging device outputs first addition data in which a signal of the second pixel and a signal of the first pixel are added, second addition data in which a signal of the third pixel and a signal of the first pixel are added, third addition data in which a signal of the fourth pixel and a signal of the first pixel are added, and fourth addition data in which signals of the first pixel are added, and
wherein the signal processing unit calculates color data of the first color by subtracting the fourth addition data from the first addition data, calculates color data of the second color by subtracting the fourth addition data from the second addition data, and calculates color data of the third color by subtracting the fourth addition data from the third addition data.

18. The signal processing device according to claim 17, wherein the first pixel is a W pixel, the W pixel being a pixel provided with a white filter, wherein the second pixel is a R pixel, the R pixel being a pixel provided with a red filter, wherein the third pixel is a B pixel, the B pixel being a pixel provided with a blue filter and wherein the fourth pixel is a G pixel, the G pixel being a pixel provided with a green filter.

* * * * *